United States Patent
Kim et al.

(10) Patent No.: US 10,623,155 B2
(45) Date of Patent: Apr. 14, 2020

(54) UPLINK CHANNEL TRANSMITTING METHOD AND USER DEVICE, AND UPLINK CHANNEL RECEIVING METHOD AND BASE STATION

(71) Applicant: LG ELECTRONICS INC., Seoul (KR)

(72) Inventors: Eunsun Kim, Seoul (KR); Suckchel Yang, Seoul (KR); Yunjung Yi, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 15/781,993

(22) PCT Filed: Dec. 7, 2016

(86) PCT No.: PCT/KR2016/014267
§ 371 (c)(1),
(2) Date: Jun. 6, 2018

(87) PCT Pub. No.: WO2017/099461
PCT Pub. Date: Jun. 15, 2017

(65) Prior Publication Data
US 2018/0359068 A1 Dec. 13, 2018

Related U.S. Application Data

(60) Provisional application No. 62/264,307, filed on Dec. 7, 2015, provisional application No. 62/268,506, filed
(Continued)

(51) Int. Cl.
*H04W 72/14* (2009.01)
*H04W 72/04* (2009.01)
(Continued)

(52) U.S. Cl.
CPC .......... *H04L 5/0048* (2013.01); *H04L 1/0038* (2013.01); *H04L 1/0072* (2013.01);
(Continued)

(58) Field of Classification Search
CPC ......... H04W 72/0413; H04W 72/0446; H04W 72/0453; H04W 72/14; H04L 5/0053; H04L 5/0007
See application file for complete search history.

(56) References Cited

U.S. PATENT DOCUMENTS

2014/0254421 A1  9/2014  Ahlander et al.
2014/0286255 A1  9/2014  Nam et al.
(Continued)

OTHER PUBLICATIONS

Author Unknown, 3GPP TR 36.881: Study on latency reduction techniques for LTE, pp. 1-86, Nov. 2015 (Year: 2015).*
(Continued)

*Primary Examiner* — Christopher M Crutchfield
(74) *Attorney, Agent, or Firm* — Dentons US LLP

(57) ABSTRACT

A first uplink channel and a first uplink reference signal for demodulating the first uplink channel may be transmitted within a first TTI having a predetermined time length. A second uplink channel and a second uplink reference signal for demodulating the second uplink channel may be transmitted within a second TTI having the predetermined time length. The first uplink reference signal may be transmitted in the last symbol among symbols in the first TTI, and the first uplink channel may be transmitted in the symbols remaining after excluding the last symbol of the first TTI from the symbols in the first TTI, and the second uplink reference signal may be transmitted in the first symbol among symbols in the second TTI symbols, and the second uplink channel may be transmitted in the symbols remaining after excluding the first symbol of the second TTI from the
(Continued)

symbols in the second TTI. The last symbol of the first TTI and the first symbol of the second TTI may be the same symbol.

20 Claims, 22 Drawing Sheets

Related U.S. Application Data on Dec. 17, 2015, provisional application No. 62/291,560, filed on Feb. 5, 2016.

(51) Int. Cl.
*H04L 5/00* (2006.01)
*H04L 1/00* (2006.01)
*H04W 8/24* (2009.01)
*H04B 7/06* (2006.01)
*H04W 8/26* (2009.01)

(52) U.S. Cl.
CPC ......... *H04W 8/24* (2013.01); *H04W 72/0406* (2013.01); *H04W 72/0453* (2013.01); *H04W 72/14* (2013.01); *H04B 7/0626* (2013.01); *H04L 5/001* (2013.01); *H04L 5/0051* (2013.01); *H04L 5/0055* (2013.01); *H04W 8/26* (2013.01); *H04W 72/0446* (2013.01)

(56) References Cited

U.S. PATENT DOCUMENTS

| | | | |
|---|---|---|---|
| 2015/0138999 A1* | 5/2015 | Avudainayagam ... | H04L 1/1607 370/252 |
| 2016/0095094 A1* | 3/2016 | Xu ..................... | H04W 72/042 370/336 |
| 2016/0100395 A1* | 4/2016 | Xu ..................... | H04L 1/1607 370/336 |
| 2016/0219560 A1* | 7/2016 | Chen .................. | H04W 72/042 |
| 2017/0290008 A1* | 10/2017 | Tooher ................ | H04L 1/0007 |
| 2017/0303250 A1* | 10/2017 | Shao .................. | H04L 51/00 |
| 2017/0318564 A1* | 11/2017 | Lee ................... | H04L 1/00 |

OTHER PUBLICATIONS

Huawei, HiSilicon, "Views on TTI length," 3GPP TSG RAN WG1 Meeting #83, Nov. 15-22, 2015, R1-156459.

Huawei, HiSilicon, "Discussion on DL RS and UL RS for short TTI," 3GPP TSG RAN WG1 Meeting #83, Nov. 15-22, 2015, R1-156460.

Ericsson, "Physical layer aspects of short TTI for uplink transmissions," 3GPP TSG RAN WG1 Meeting #83, Nov. 15-22, 2015, R1-157149.

* cited by examiner

PUCCH format 1a/1b structure (normal CP)

PUCCH format 2/2a/2b structure (normal CP)

(a) 1/2 symbol TTI UL structure (b) 2/3 symbol TTI UL structure (c) 3/4 symbol TTI UL structure

UPLINK CHANNEL TRANSMITTING METHOD AND USER DEVICE, AND UPLINK CHANNEL RECEIVING METHOD AND BASE STATION

This application is a 35 use § 371 national stage entry of international application no. PCT/KR2016/014267 filed on Dec. 7, 2016, and claims priority to U.S. provisional application Nos. 62/264,307 filed on Dec. 7, 2015; 62/268,506 filed on Dec. 17, 2015 and 62/291,560 filed on Feb. 5, 2016, all of which are hereby incorporated by reference in their entireties as if fully set forth herein.

TECHNICAL FIELD

The present invention relates to a wireless communication system and, more particularly, to a method for transmitting or receiving uplink channel and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

Further, along with the technology development, a delay or overcoming a delay has emerged as an important issue. The performances of more and more applications depend on a delay/latency. Accordingly, there is a need for a method for reducing a delay/latency, compared to a legacy system.

With advances in smart devices, a new method of efficiently transmitting/receiving a small amount of data or efficiently transmitting/receiving occasionally occurring data is needed.

In addition, a method of transmitting/receiving signals in a system supporting new radio access technology is needed.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of transmitting an uplink (UL) channel by a user equipment in a wireless communication system. The method includes transmitting a first UL channel and a first UL reference signal for demodulating the first UL channel in a first transmission time interval (TTI) of a specific time length; and transmitting a second UL channel and a second UL reference signal for demodulating the second UL channel in a second TTI of the specific time length. The first UL reference signal may be transmitted on a last symbol among symbols in the first TTI and the first UL channel may be transmitted on the other symbols except for the last symbol of the first TTI among the symbols in the first TTI. The second UL reference signal may be transmitted on a first symbol among symbols in the second TTI and the second UL channel may be transmitted on the other symbols except for the first symbol of the second TTI among the symbols in the second TTI. The last symbol of the first TTI and the first symbol of the second TTI may be the same symbol.

According to another aspect of the present invention, provided herein is a method of receiving an uplink (UL) channel by a base station in a wireless communication system. The method includes receiving a first UL channel and a first UL reference signal for demodulating the first UL channel in a first transmission time interval (TTI) of a specific time length from a user equipment; and receiving a second UL channel and a second UL reference signal for demodulating the second UL channel in a second TTI of the specific time length from the user equipment. The first UL reference signal may be transmitted on a last symbol among symbols in the first TTI and the first UL channel may be transmitted on the other symbols except for the last symbol of the first TTI among the symbols in the first TTI. The second UL reference signal may be transmitted on a first symbol among symbols in the second TTI and the second UL channel may be transmitted on the other symbols except for the first symbol of the second TTI among the symbols in the second TTI. The last symbol of the first TTI and the first symbol of the second TTI may be the same symbol.

According to another aspect of the present invention, provided herein is a user equipment for transmitting an uplink (UL) channel in a wireless communication system. The user equipment includes a radio frequency (RF) unit, and a processor configured to control the RF unit. The processor may be configured to control the RF unit to transmit a first UL channel and a first UL reference signal for demodulating the first UL channel in a first transmission time interval (TTI) of a specific time length; and control the RF unit to transmit a second UL channel and a second UL reference signal for demodulating the second UL channel in a second TTI of the specific time length. The first UL reference signal may be transmitted on a last symbol among symbols in the first TTI and the first UL channel may be transmitted on the other symbols except for the last symbol of the first TTI among the symbols in the first TTI. The second UL reference signal may be transmitted on a first symbol among symbols in the second TTI and the second UL channel may be transmitted on the other symbols except for the first symbol of the second TTI among the symbols in the second TTI. The last symbol of the first TTI and the first symbol of the second TTI may be the same symbol.

According to another aspect of the present invention, provided herein is a base station for receiving an uplink (UL) channel in a wireless communication system. The base station includes a radio frequency (RF) unit, and a processor configured to control the RF unit. The processor may be configured to control the RF unit to receive a first UL channel and a first UL reference signal for demodulating the first UL channel in a first transmission time interval (TTI) of a specific time length from a user equipment; and control the RF unit to receive a second UL channel and a second UL reference signal for demodulating the second UL channel in a second TTI of the specific time length from the user equipment. The first UL reference signal may be transmitted on a last symbol among symbols in the first TTI and the first UL channel may be transmitted on the other symbols except for the last symbol of the first TTI among the symbols in the first TTI. The second UL reference signal may be transmitted on a first symbol among symbols in the second TTI and the second UL channel may be transmitted on the other symbols except for the first symbol of the second TTI among the symbols in the second TTI. The last symbol of the first TTI and the first symbol of the second TTI may be the same symbol.

In each aspect of the present invention, the specific time length may be equal to or less than 0.5 ms.

In each aspect of the present invention, the first TTI and the second TTI may be configured in a subframe having a time length of 1 ms.

In each aspect of the present invention, information indicating the specific time length may be provided to the UE.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a wireless communication system is improved.

According to an embodiment of the present disclosure, a delay/latency may be reduced during communication between a UE and a BS.

A small amount of data or occasionally occurring data, due to advances in smart devices, can be efficiently transmitted/received.

In addition, in a system supporting new radio access technology, signals can be efficiently transmitted and received.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
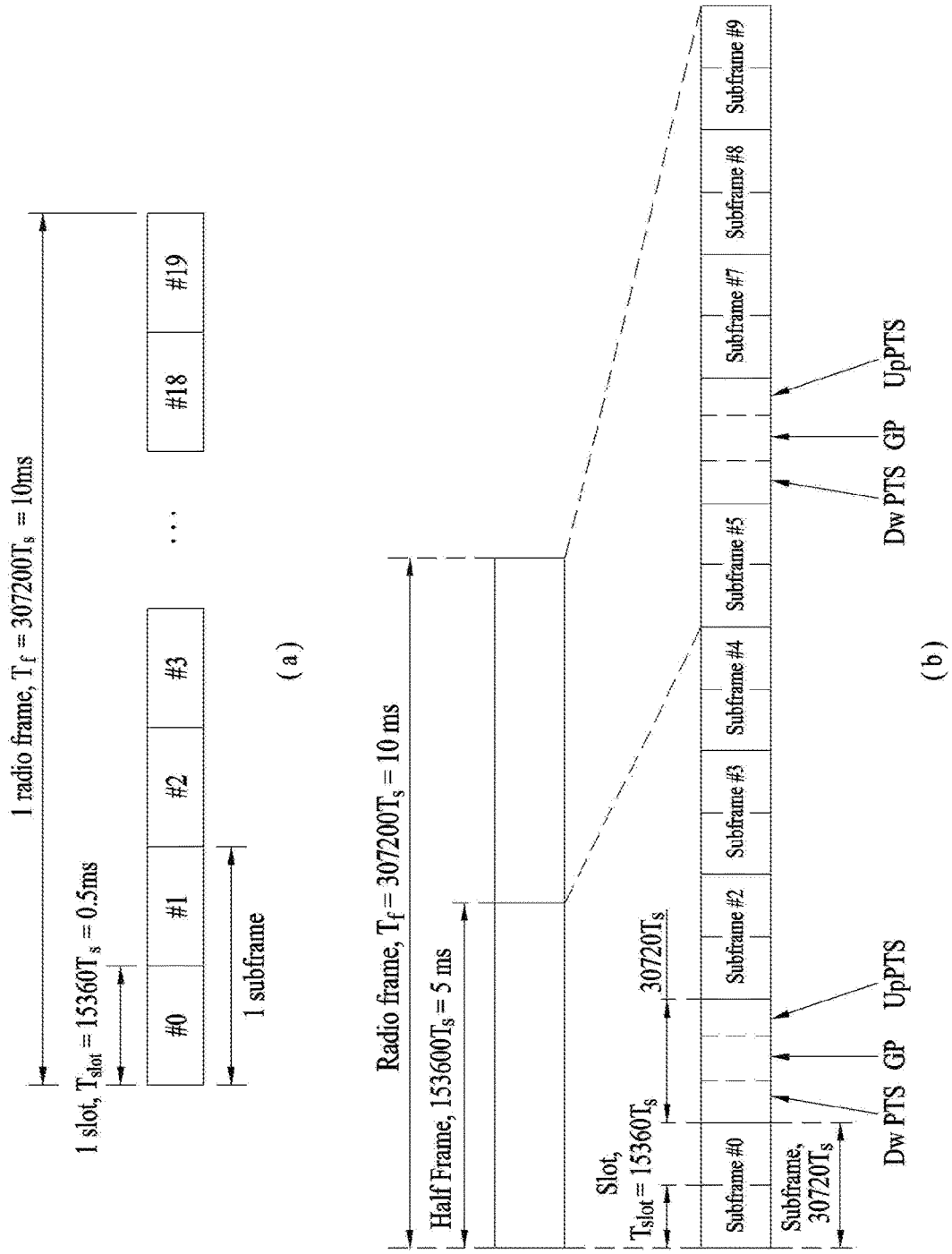
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In an LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource.

Meanwhile, a 3GPP LTE/LTE-A system uses the concept of a cell to manage a radio resource. A cell associated with the radio resource is different from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

Among the terms and technologies used in the present invention, for the terms and technologies which are not described in detail, refer to 3GPP LTE/LTE-A standard documents, for example, 3GPP TS 36.211, 3GPP TS 36.212, 3GPP TS 36.213, 3GPP TS 36.321 and 3GPP TS 36.331.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms ($307{,}200 T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

TTI means an interval where data may be scheduled. For example, referring to FIGS. 1 and 3, transmission occasion of UL grant or DL grant in the current LTE/LTE-A system exists per 1 ms, and UL/DL grant does not exist several times within a time shorter than 1 ms. Therefore, in the current LTE/LTE-A system, TTI is 1 ms.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | | Normal cyclic prefix in downlink | | | Extended cyclic prefix in down | | |
|---|---|---|---|---|---|---|---|
| | | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |

TABLE 2-continued

| | Normal cyclic prefix in downlink | | | Extended cyclic prefix in down | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | — |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
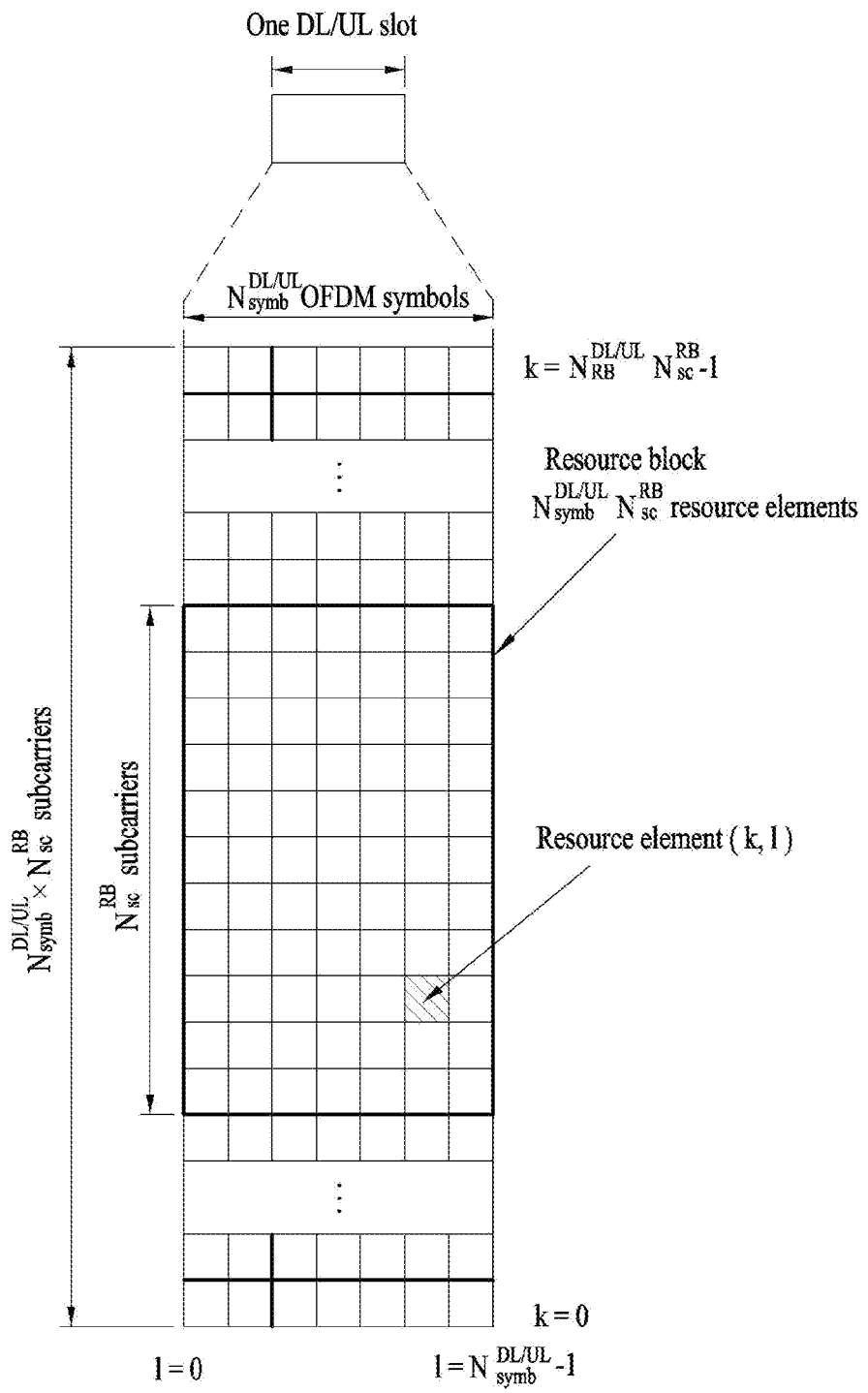
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and NULRB denotes the number of RBs in a UL slot. $N^{DL}_{RB}$ and $N^{DL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as NDL/ULsymb (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone.

Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
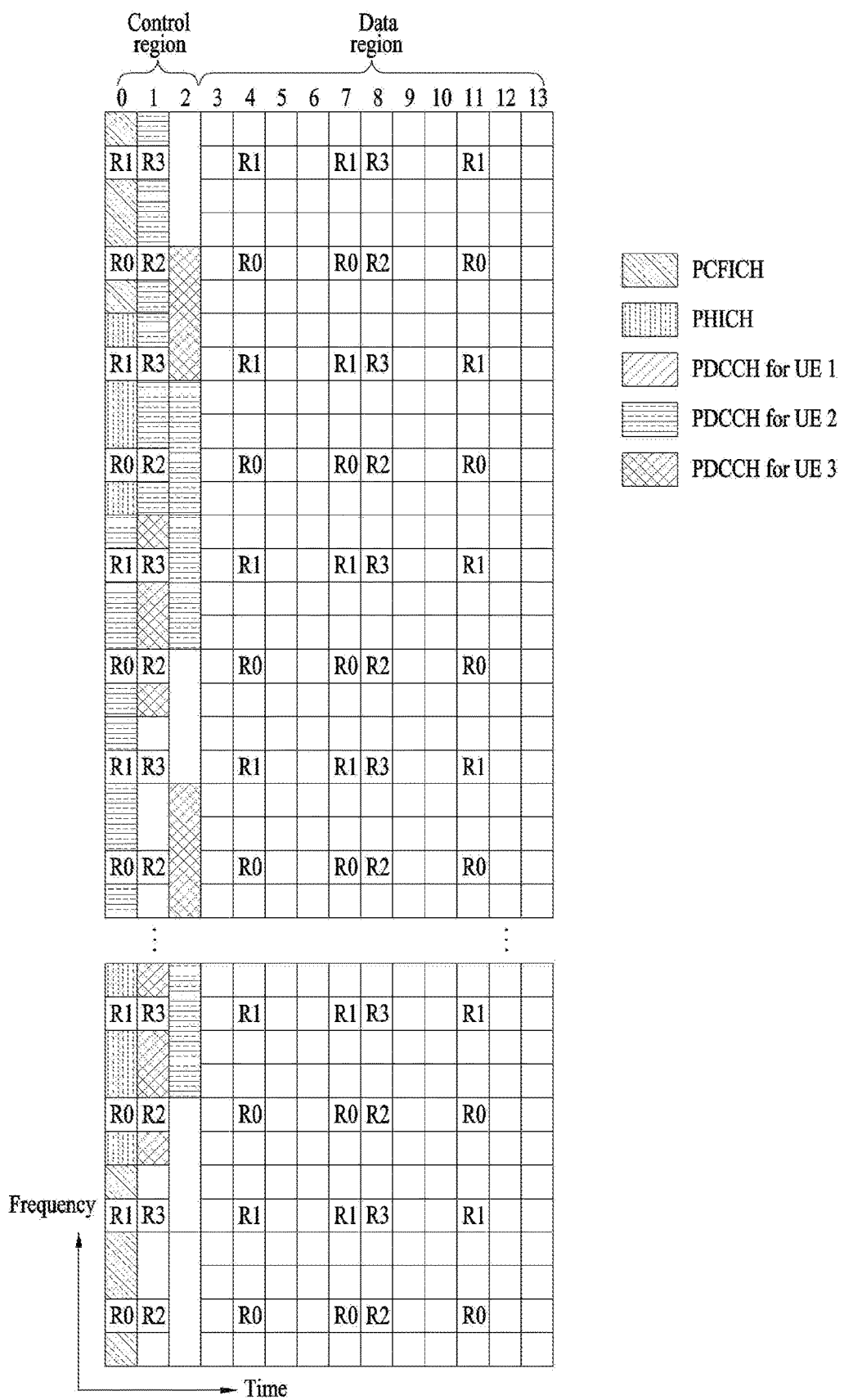
FIG. 3 illustrates the structure of a DL subframe used in a wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

A set of OFDM symbols available for the PDCCH at a subframe is given by the following Table.

TABLE 3

| Subframe | Number of OFDM symbols for PDCCH when $N^{DL}_{RB} > 10$ | Number of OFDM symbols for PDCCH when $N^{DL}_{RB} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB}>10$, the number 1, 2 or 3 of OFDM symbols which are spans of DCI carried by the PDCCH is given by the CFI. For a downlink system bandwidth $N^{DL}_{RB} \leq 10$, the number 2, 3 or 4 of OFDM symbols which are spans of DCI carried by the PDCCH is given by CFI+1.

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows DCI formats.

TABLE 4

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

In addition to the DCI formats defined in Table 4, other DCI formats may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

For example, a transmission mode is semi-statically configured for the UE by a higher layer so that the UE may receive a PDSCH transmitted in accordance with one of a plurality of transmission modes which are previously defined. The UE attempts to decode a PDCCH using DCI formats only corresponding to its transmission mode. In other words, in order to maintain UE operation load according to blind decoding attempt, at a certain level or less, all DCI formats are not searched by the UE at the same time. Table 5 shows transmission modes for configuring MIMO technology and DCI formats for performing blind detection by the UE in a corresponding transmission mode. Particularly, Table 5 shows the relationship between a PDCCH and a PDSCH configured by a cell radio network temporary identifier (RNTI) (C-RNTI).

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element

TABLE 5

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2D | UE specific by C-RNTI | Up to 8 layer transmission, ports 7-14 or single antenna port, port 7 or 8 |

Table 5 lists transmission modes 1 to 10. However, transmission modes other than the transmission modes defined in Table 5 may be defined.

Referring to Table 5, for example, the UE configured as transmission mode 9 decodes PDCCH candidates of a UE-specific search space (USS) according to DCI format 1A and decodes PDCCH candidates of a common search space (CSS) and the USS according to DCI format 2C. The UE may decode a PDSCH according to DCI that the UE succeeds in decoding using a DCI format. If the UE succeeds in decoding the DCI using DCI format 1A in one of a plurality of PDCCH candidates, the UE may decode the PDSCH under the assumption that up to 8 layers using antenna ports 7 to 14 are transmitted to the UE through the PDSCH or decode the PDSCH under the assumption that a single layer using an antenna port 7 or 8 is transmitted to the UE through the PDSCH.

groups (REGs). For example, each CCE includes 9 REGs, which are distributed over first 1/2/3 (4 if necessary for 1.4 MHz) OFDM symbols and system bandwidth through interleaving to enable diversity and attenuate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

CCEs available for PDCCH transmission in a system is numbered from 0 to $N_{CCE}-1$, where $N_{CCE}=floor(N_{REG}/9)$, where $N_{REG}$ is the number of REGs not allocated to the PCFICH or the PHICH.

A DCI format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as a search space (SS). SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The following table shows an example of aggregation levels for defining SSs.

TABLE 6

| | Search space $S^{(L)}_k$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Figure 4:
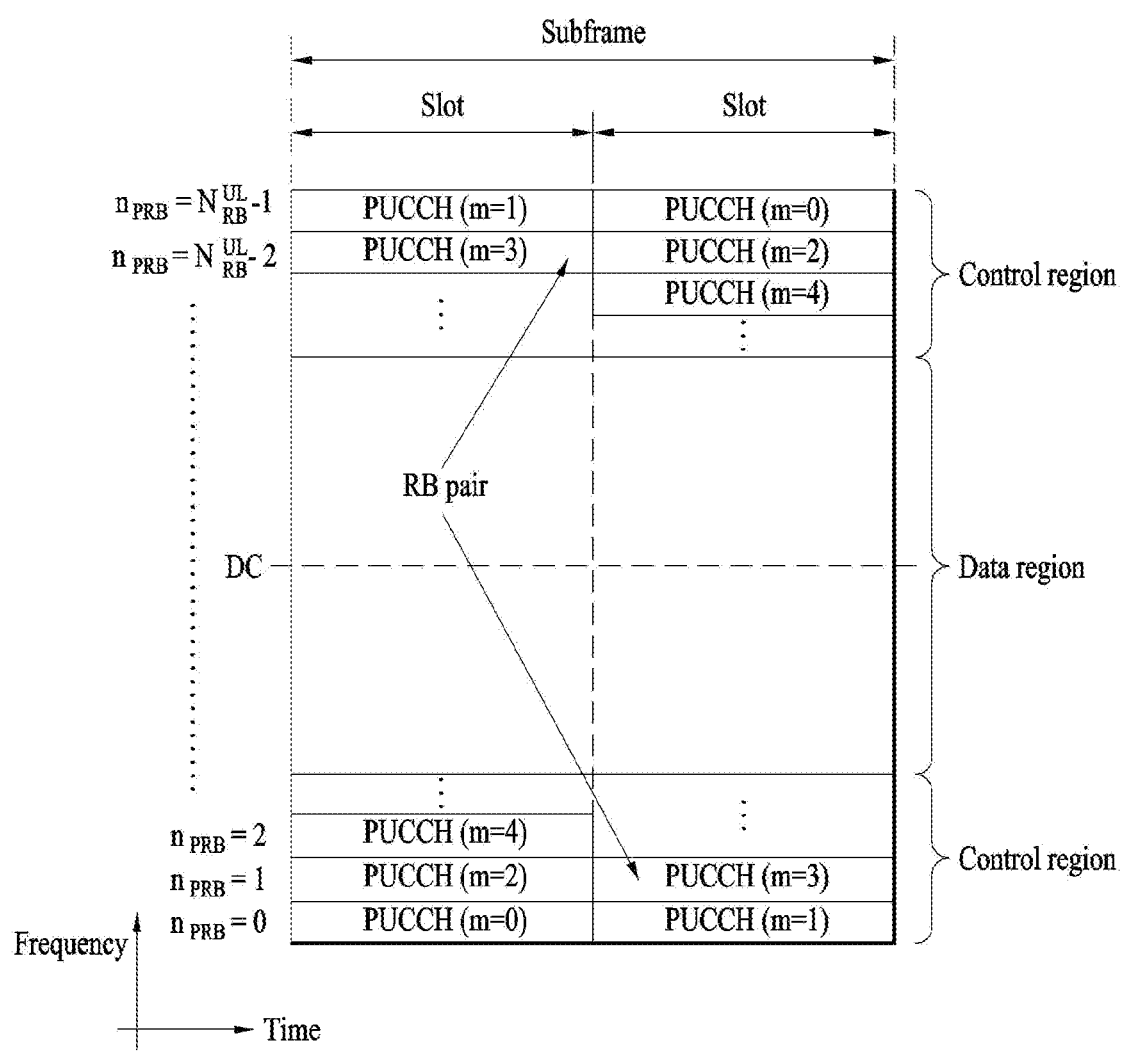
FIG. 4 illustrates the structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

Various PUCCH formats for UCI transmission may be used. A size and usage of UCI carried by one PUCCH are varied depending on a PUCCH format, and the size of the UCI may be varied depending on a coding rate.

Figure 5:
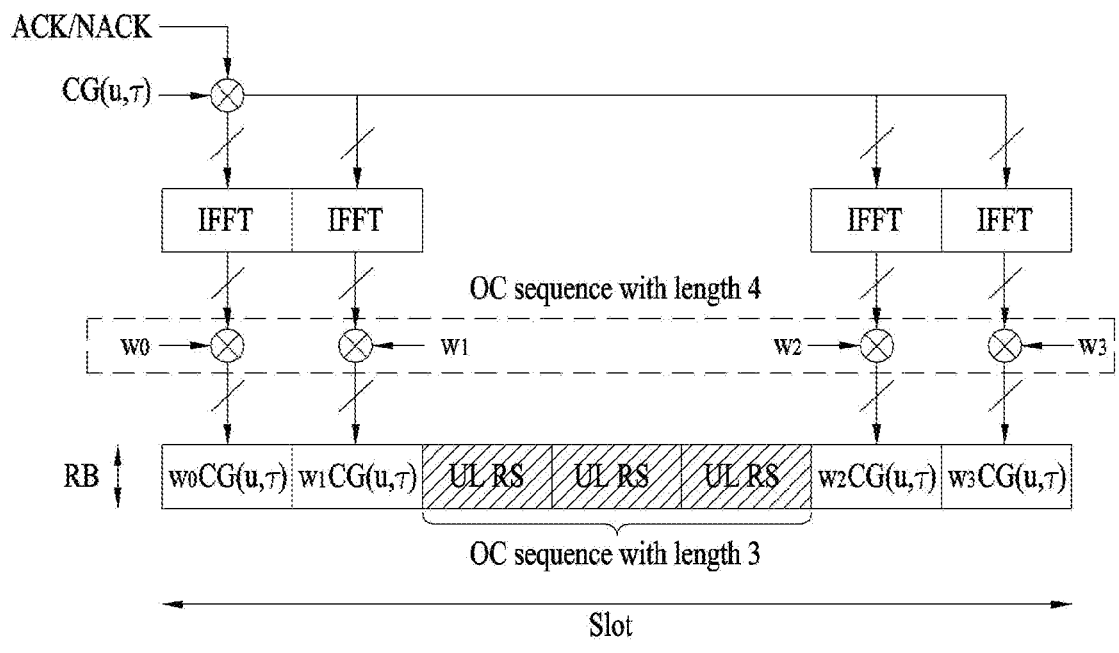
FIGS. 5 to 7 illustrate structures of PUCCH format 1, PUCCH format 2, and PUCCH format 3.
Figure 6:
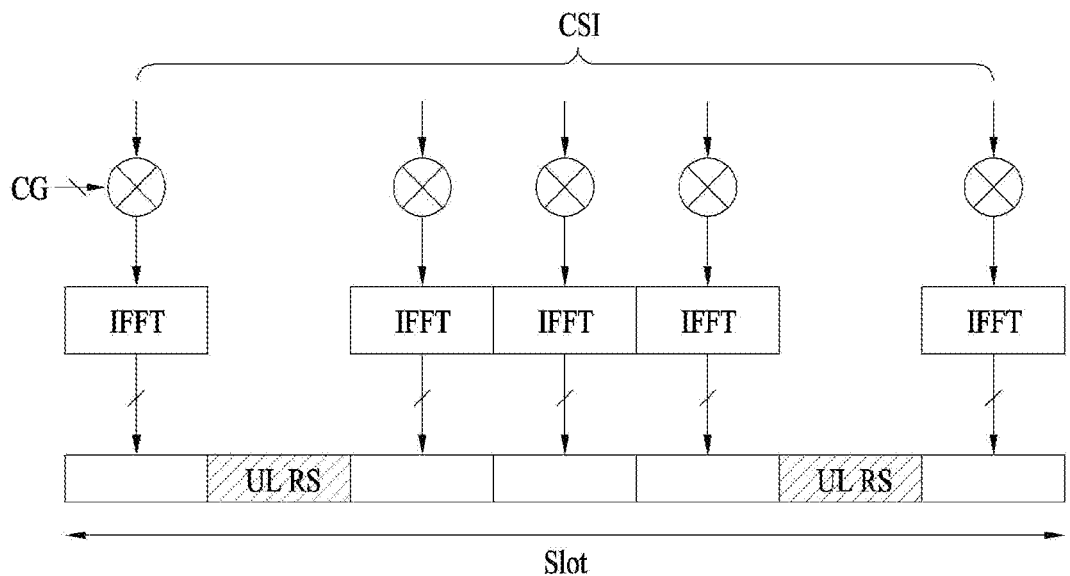
Figure 7:
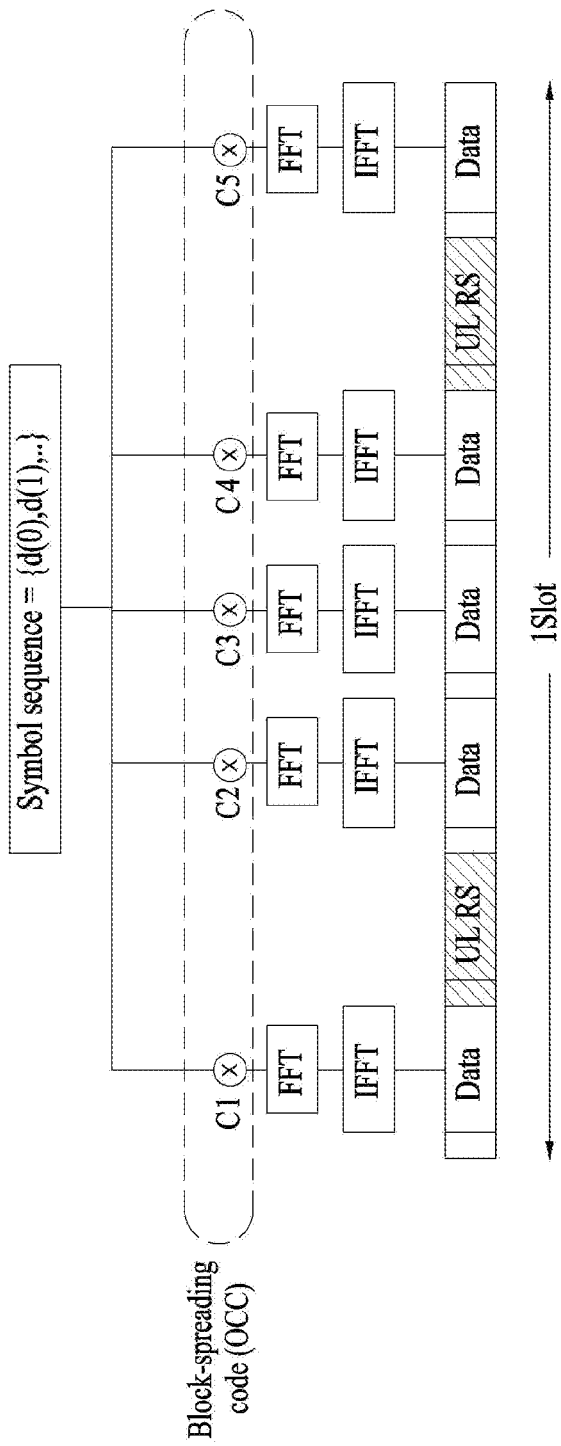

FIGS. 5 to 7 illustrate structures of PUCCH format 1, PUCCH format 2, and PUCCH format 3.

In a 3GPP LTE/LTE-A system, a DL/UL subframe having a normal CP includes two slots each including 7 OFDM symbols and a DL/UL subframe having an extended CP includes two slots each including 6 OFDM symbols. Since the number of OFDM symbols in each subframe differs according to CP length, a structure in which a PUCCH is transmitted in a UL subframe also differs according to CP length. Therefore, a method of transmitting UCI in the UL subframe by the UE is varied according to PUCCH format and CP length.

As mentioned in FIG. 4, one PUCCH is configured over two slots of a subframe. Referring to FIGS. 5 to 7, the PUCCH is transmitted together with a UL RS for demodulating the PUCCH in each of two slots in which the PUCCH is configured.

As mentioned in FIG. 4, one PUCCH is configured over two slots of a subframe. Referring to FIGS. 5 to 7, the PUCCH is transmitted together with a UL RS for demodulating the PUCCH in each of two slots in which the PUCCH is configured.

Figure 8:
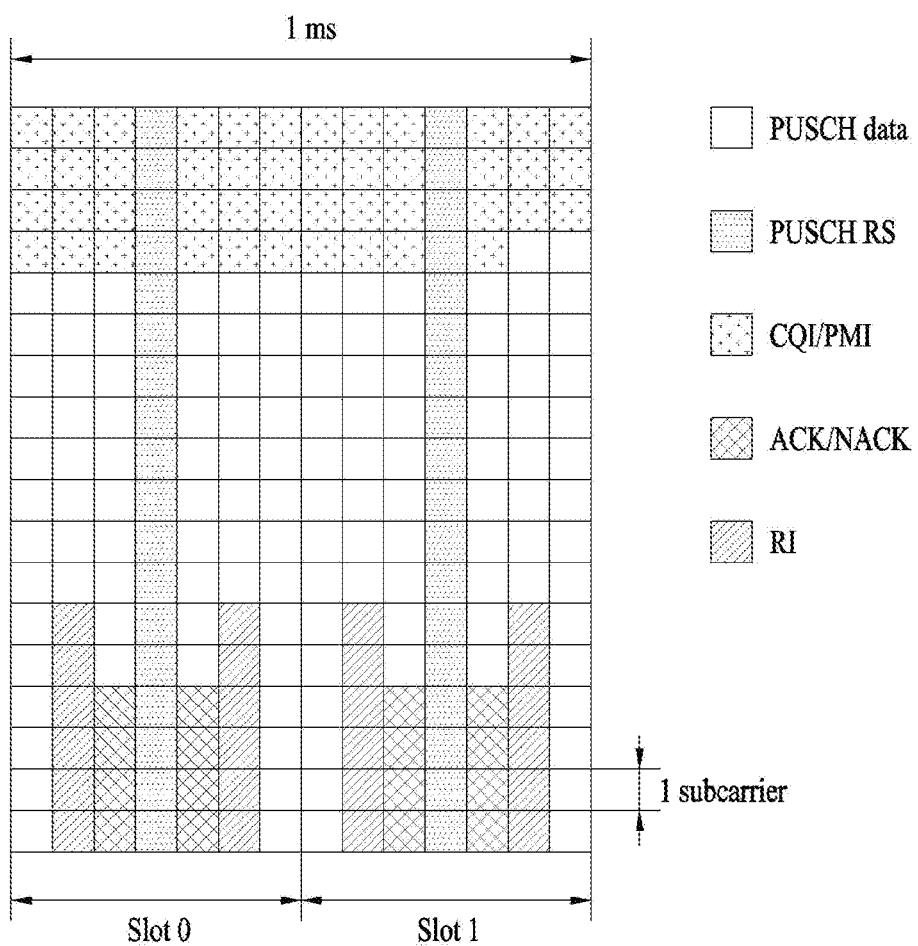
FIG. 8 illustrates multiplexing of UL control information and UL data in a PUSCH region.

FIG. 8 illustrates multiplexing of UCI and UL data in a PUSCH region.

A DM RS, which is an RS used to demodulate the UL data, may be transmitted together with the UL data in a data region of the UL subframe. Hereinafter, a control region and a data region in the UL subframe will be referred to as a PUCCH region and a PUSCH region, respectively.

If UCI needs to be transmitted in a subframe to which PUSCH transmission is allocated, the UE multiplexes the UCI and UL data (hereinafter, PUSCH data) prior to discrete Fourier transform (DFT)-spreading and transmits the multiplexed UL signal on a PUSCH, unless simultaneous transmission of a PUSCH and a PUCCH is permitted. The UCI includes at least one of CQI/PMI, HARQ ACK/NACK, and RI. The number of REs used for CQI/PMI, ACK/NACK, and RI transmission is based on a modulation and coding scheme (MCS) allocated for PUSCH transmission and on offset values $\Delta^{CQI}_{offset}$, $\Delta^{HARQ-ACK}_{offset}$, and $\Delta^{RI}_{offset}$. The offset values permit different coding rates according to the UCI and are semi-statically configured by higher-layer (e.g. radio resource control (RRC) signaling. The PUSCH data and the UCI are not mapped to the same RE. The UCI is mapped such that the UCI may be present in both slots of a subframe.

Referring to FIG. 8, CQI and/or PMI (CQI/PMI) resources are located at the start part of PUSCH data resources. The CQI/PMI resources are sequentially mapped to all SC-FDMA symbols on one subcarrier and then are mapped on the next subcarrier. The CQI/PMI resources are mapped starting from left to right, that is, in the direction of ascending SC-FDMA symbol index, within a subcarrier. The PUSCH data is rate-matched in consideration of the amount of CQI/PMI resources (i.e. the number of coded symbols). A modulation order which is the same as the modulation order of UL-SCH data is used for CQI/PMI. ACK/NACK is inserted through puncturing part of SC-FDMA resources to which UL-SCH data is mapped. ACK/NACK is located beside a PUSCH RS which is an RS used to demodulate the PUSCH data and is filled starting from bottom to top, that is, in the direction of ascending subcarrier index, within an SC-FDMA symbol. In the case of a normal CP, SC-FDMA symbols for ACK/NACK are located at SC-FDMA symbols #2/#5 in each slot as illustrated in FIG. 8. Irrespective of whether ACK/NACK is actually transmitted in a subframe, a coded RI is located next to the symbol for ACK/NACK.

In 3GPP LTE, the UCI may be scheduled to be transmitted on a PUSCH without the PUSCH data. ACK/NACK, RI, and CQI/PMI may be multiplexed in a similar way to multiplexing as illustrated in FIG. 8. Channel coding and rate matching for control signaling without the PUSCH data are identical to channel coding and rate matching for control signaling with the PUSCH data.

In FIG. 8, the PUSCH RS may be used to demodulate the UCI and/or the PUSCH data transmitted in a PUSCH region. In the present invention, a UL RS associated with PUCCH transmission and a UL RS associated with PUSCH transmission are referred as a PUCCH RS and a PUSCH RS, respectively.

Meanwhile, although not shown in FIG. 8, a sounding reference signal (SRS) may be allocated to a PUSCH region. The SRS is a UL RS not associated with PUSCH or PUCCH transmission. The SRS is transmitted on an OFDM symbol which is located at the last part of a UL subframe in the time domain and on a data transmission band of the UL subframe, that is, on the PUSCH region, in the frequency domain. The eNB may measure a UL channel state between the UE and the eNB using the SRS. SRSs of multiple UEs transmitted/received on the last OFDM symbol of the same subframe may be distinguished according to frequency location/sequence.

Since the PUCCH RS, the PUSCH RS, and the SRS are UE-specifically generated by a specific UE and are transmitted to the eNB, these signals may be regarded as UL UE-specific RSs (hereinafter, UL UE-RSs). The UL UE-RSs are defined by a cyclic shift α of a base sequence $r_{u,v}(n)$ according to a predetermined rule. For the PUCCH RS, the PUSCH RS, and the SRS, a plurality of base sequences is defined. For example, base sequences may be defined using a root Zadoff-Chu sequence. Base sequences $r_{u,v}(n)$ are divided into groups. Each base sequence group includes one or more base sequences. Among the plural base sequences, a base sequence for the UL UE-RSs is determined based on a cell identifier, an index of a slot to which the UL UE-RSs are mapped, and the like. The cell identifier may be a physical layer cell identifier acquired by the UE from a synchronization signal or a virtual cell identifier provided by a higher layer signal. A cyclic shift value used for cyclic shift of a base sequence is determined based on the cell identifier, a cyclic shift related value given by DCI and/or a higher layer, the index of the slot to which the UL UE-RSs are mapped, and the like.

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs in each of UL and DL are aggregated to support a BW of 60 MHz. The CCs may be contiguous or non-contiguous in the frequency domain. Although a case that a BW of UL CC and a BW of DL CC are the same and are symmetrical is described, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

A configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, pre-reserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell.

For reference, a carrier indicator (CI) means a serving cell index ServCellIndex and CI=0 is applied to a Pcell. The serving cell index is a short identity used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling). In a legacy system based on communication with one node, since a UE-RS, a CSI-RS, and a CRS are transmitted at the same location, the UE does not consider that delay spread, Doppler spread, frequency shift, average received power, and reception timing of a UE-RS port, a CSI-RS port, and a CRS port may differ. However, in a communication system to which coordinated multi-point (CoMP) communication technology in which more than one node can simultaneously participate in communication with the UE is applied, properties of the PDCCH port, the PDSCH port, the UE-RS port, the CSI-RS port, and/or the CRS port may be different. For this reason, the concept of a quasi co-located antenna port is introduced for a mode in which a plurality of nodes has the probability of participating in communication (hereinafter, a CoMP mode).

"Quasi co-located (QCL)" (or "quasi co-location (QCL)") may be defined as follows in terms of an antenna port. If two antenna ports are quasi co-located, the UE may assume that large-scale properties of a signal received from one of the two antenna ports can be inferred from a signal received from the other antenna port. The large-scale properties consist of delay spread, Doppler spread, frequency shift, average received power, and/or reception timing.

QCL may be defined as follows in terms of a channel. If two antenna ports are quasi co-located, the UE may assume that large-scale properties of a channel over which a symbol on one of the two antenna ports is conveyed can be inferred from a channel over which a symbol on the other antenna port is conveyed. The large-scale properties consist of delay spread, Doppler spread, Doppler shift, average gain, and/or average delay.

In embodiments of the present invention, QCL may conform to one of the above definitions. Alternatively, the definition of QCL may be varied in a similar form such that the UE may assume that antenna ports satisfying QCL assumption seem to be co-located. For example, the concept of QCL may be defined such that the UE may assume that antenna ports satisfying QCL assumption are antenna ports of the same transmission point.

The UE cannot assume that the same large-scale properties are satisfied between non-quasi-co-located (NQC) antenna ports. In this case, a typical UE needs to perform independent processing for each configured non-quasi-co-located (NQC) antenna regarding timing acquisition and tracking, frequency offset estimation and compensation, delay estimation, and Doppler estimation.

For antenna ports which can be assumed to be QCL, the UE can advantageously perform the following operations.

Regarding Doppler spread, the UE may identically apply estimation results of power-delay-profile, delay spread, Doppler spectrum, and Doppler spread for one port to a filter (e.g., a Wiener filter) which is used to perform channel estimation for another port.

Regarding frequency shift and received timing, after performing time and frequency synchronization for any one port, the UE may identically apply the same synchronization to demodulation of another port.

Regarding average received power, the UE may average measurements of reference signal received power (RSRP) over two or more antenna ports.

Upon receiving specific DMRS-based DL-related DCI format (e.g., DCI 2C) through a PDCCH/EPDCCH, the UE performs channel estimation of a scheduled PDSCH through a configured DMRS sequence and then performs data demodulation. If the UE can make a QCL assumption that a DMRS port configuration received from the DL scheduling grant and a port for a specific RS (e.g., a specific CSI-RS, a specific CRS, or a DL serving-cell CRS) are QCL, then the UE may apply the estimates of the large-scale properties estimated through the port for the specific RS during channel estimation through a corresponding DMRS port, thereby improving receiver processing performance.

Figure 9:
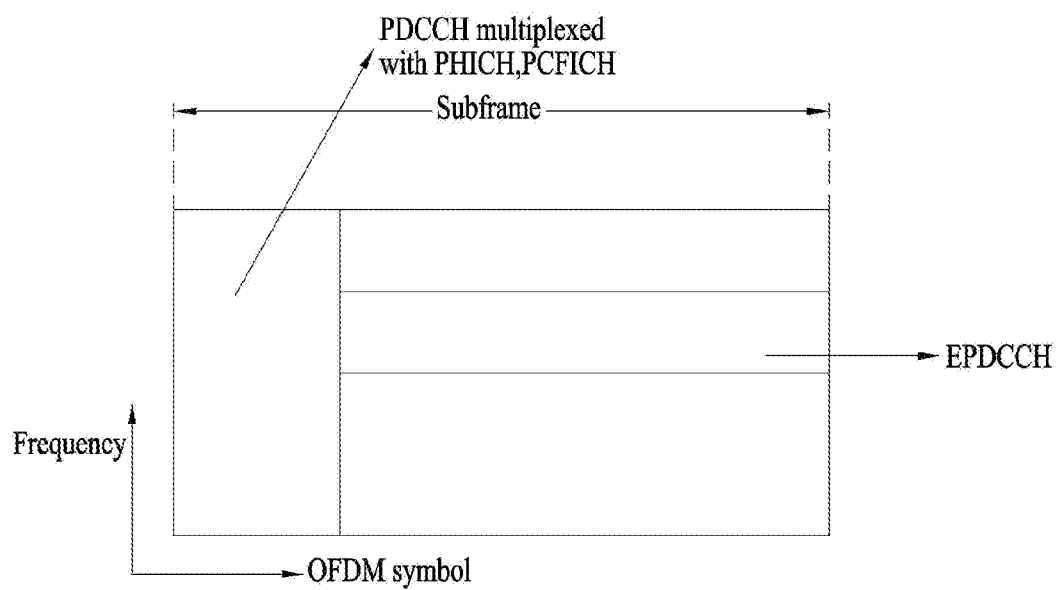
FIG. 9 illustrates a DL control channel configured in a data region of a DL subframe.

FIG. 9 illustrates a DL control channel configured in a data region of a DL subframe.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port p∈{107, 108, 109, 110} as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE monitors a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH UE-specific search space $ES^{(L)}_k$ at aggregation level L∈{1, 2, 4, 8, 16, 32} is defined by a set of EPDCCH candidates. For an EPDCCH-PRB-set p configured for distributed transmission, the ECCEs corresponding to EPDCCH candidate m of the search space $ES^{(L)}_k$ k are given by the following table.

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor\right\} + i \quad \text{Equation 1}$$

where i=0, . . . , L−1. b=$n_{CI}$ if the UE is configured with a carrier indicator field for the serving cell on which EPDCCH is monitored, otherwise b=0. $n_{CI}$ is the carrier indicator field (CIF) value, which is the same as a serving cell index (ServCellIndex). m=0, 1, . . . , $M^{(L)}_p$−1, $M^{(L)}_p$ is the number of EPDCCH candidates to monitor at aggregation level L in EPDCCH-PRB-set p. The variable $Y_{p,k}$ is defined by '$Y_{p,k}=(A_p \cdot Y_{p,k-1})$ mod D', where $Y_{p,k-1}=n_{RNTI} \neq 0$, $A_0$=39827, $A_0$=39829, D=65537 and k=floor($n_s$/2). $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by Table 7, the number of EREGs per ECCE is given by Table 8. Table 7 shows an example of supported EPDCCH formats, and Table 8 shows an example of the number of EREGs per ECCE, $N^{EREG}_{ECCE}$. Both localized and distributed transmission is supported.

TABLE 7

| | Number of ECCEs for one EPDCCH, $N^{ECCE}_{EPDCCH}$ | | | |
|---|---|---|---|---|
| | Case A | | Case B | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 8

| Normal cyclic prefix | | | Extended cyclic prefix | |
|---|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

An EPDCCH may use either localized or distributed transmission, differing in the mapping of ECCEs to EREGs and PRB pairs. One or two sets of PRB pairs which a UE shall monitor for EPDCCH transmissions can be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k}$−1. ECCE number n is corresponding to the following EREG(s):

EREGs numbered (n mod $N^{ECCE}_{RB}$)+$jN^{ECCE}_{RB}$ in PRB index floor(n/$N^{ECCE}_{RB}$) for localized mapping, and EREGs numbered floor (n/$N^{Sm}_{RB}$)+$jN^{ECCE}_{RB}$ indices (n+jmax(1,$N^{Sp}_{RB}$/$N^{EREG}_{ECCE}$))mod $N^{Sp}_{RB}$ for distributed mapping, where j=0, 1, . . . , $N^{EREG}_{ECCE}$−1, $N^{EREG}_{ECCE}$ is the number of EREGs per ECCE, and $N^{ECCE}_{RB}$=16/$N^{EREG}_{ECCE}$ is the number of ECCEs per RB pair. The PRB pairs constituting EPDCCH set $S_p$ are assumed to be numbered in ascending order from 0 to $N^{Sp}_{RB}$−1.

Case A in Table 7 applies when:

DCI formats 2, 2A, 2B, 2C or 2D is used and $N^{DL}_{RB} \geq 25$, or any DCI format when $n_{EPDCCH}<104$ and normal cyclic prefix is used in normal subframes or special subframes with configuration 3, 4, 8.

Otherwise case 2 is used. The quantity $n_{EPDCCH}$ for a particular UE is defined as the number of downlink resource elements (k,l) in a PRB pair configured for possible EPDCCH transmission of EPDCCH set $S_0$ and fulfilling all of the following criteria, they are part of any one of the 16 EREGs in the physical resource-block pair, they are assumed by the UE not to be used for CRSs or CSI-RSs, the index l in a subframe fulfils l≥$l_{EPDCCHStart}$.

where $l_{EPDCCHStart}$ is given based on higher layer signaling 'epdcch-StartSymbol-r11', higher layer signaling 'pdsch-Start-r1', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by Table 12 with n'=$n_{ECCE,low}$ mod $N^{ECCE}_{RB}$+$n_{RNTI}$ mod min($N^{ECCE}_{EPDCCH}$,$N^{ECCE}_{RB}$), where $n_{ECCE,low}$ is the lowest ECCE index used by this EPDCCH transmission in the EPDCCH set, $n_{RNTI}$ corresponds to the RNTI associated with the EPDCCH transmission, and $N^{ECCE}_{EPDCCH}$ is the number of ECCEs used for this EPDCCH.

TABLE 9

| | Normal cyclic prefix | | |
|---|---|---|---|
| n' | Normal subframes, Special subframes, configurations 3, 4, 8 | Special subframes, configurations 1, 2, 6, 7, 9 | Extended cyclic prefix Any subframe |
| 0 | 107 | 107 | 107 |
| 1 | 108 | 109 | 108 |
| 2 | 109 | — | — |
| 3 | 110 | — | — |

For distributed transmission, each resource element in an EREG is associated with one out of two antenna ports in an alternating manner where $p \in \{107, 109\}$ for normal cyclic prefix and $p \in \{107, 108\}$ for extended cyclic prefix.

Hereinbelow, the PDCCH and the EPDCCH are collectively referred to as the PDCCH or the (E)PDCCH.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and/or PDSCH may be transmitted to the MTC UE having the coverage issue in a plurality of subframes (e.g. about 100 subframes).

Embodiments of the present disclosure are also applicable to a new radio access technology (RAT) system in addition to the 3GPP LTE/LTE-A system. As more and more communication devices require a larger communication capacity, the need for enhanced mobile broadband communication, compared to the legacy RAT, is pressing. Further, massive MTC that interconnects a plurality of devices and things and thus provides them with various services irrespective of time and place is also one of important issues to be considered for future-generation communication. In addition, a communication system design in which services/UEs sensitive to reliability and latency are considered is under discussion. The introduction of a future-generation RAT in consideration of the enhanced mobile broadband communication, massive MTC, and ultra-reliable and low-latency communication (URLLC) is under discussion. For the convenience, the corresponding technology is referred to as a new RAT in the present disclosure.

In the next LTE-A system, a technique for reducing the latency of data transmission is considered. Packet data latency is one of performance metrics that vendors, operators, and end-users measure regularly (by a speed test application). Among all phases of the lifetime of a wireless access network system, a latency is measured in a new software release or system component verification phase, a system deployment phase, and a system commercialization phase.

Better latency than in previous generations of 3GPP RATs was one performance metric that led to the design of LTE. LTE is now perceived to end-users as a system that provides faster access to the Internet and lower data latencies than previous generations of mobile radio technologies.

However, almost no improvements targeting particularly at delays in a system have been made. Packet data latency is a parameter that indirectly affects the throughput of the system as well as the perceived responsiveness of the system. Hypertext transfer protocol/transmission control protocol (HTTP/TCP) is a dominant application and transport layer protocol suite used on the Internet today. According to HTTP Archive (http://httparchive.org/trends.php), HTTP-based transactions over the Internet are in a range of a few 10's of Kbytes to 1 Mbyte. In this size range, a TCP slow start period is a significant part of the total transport period of a packet stream. During the TCP slow start, the performance is limited by a latency. Hence, an improved latency may be readily presented to improve the average throughput for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in a UE and an eNB is to reduce a latency.

Radio resource efficiency may also be positively affected by latency reduction. A lower packet data latency may increase the number of transmission attempts possible within a certain delay bound. Hence, higher block error rate (BLER) targets may be used for data transmissions, freeing up radio resources but still keeping the same level of robustness for UEs in poor radio conditions. If the same BLER target is maintained, the increased number of possible transmissions within a certain delay bound may be interpreted as more robust transmissions of real-time data streams (e.g. voice over LTE (VoLTE)). This may improve the VoLTE voice system capacity.

There are a number of existing applications that may be positively affected by a reduced latency in terms of perceived quality of experience, such as gaming, real-time applications like VoLTE/over-the-top voice over Internet protocol (OTT VoIP), and video telephony/conferencing.

In the future, more and more new applications will be delay-critical. For example, delay may be a critical element to remote control/driving of vehicles, augmented reality applications in smart glasses, or specific machine communications requiring low latency as well as critical communications.

In embodiments of the present disclosure, which will be described below, "assumes" may mean that an entity transmitting a channel transmits the channel in accordance with the corresponding "assumption" or that an entity receiving the channel receives or decodes the channel in the form conforming to the "assumption" on the premise that the channel has been transmitted according to the "assumption".

Figure 10:
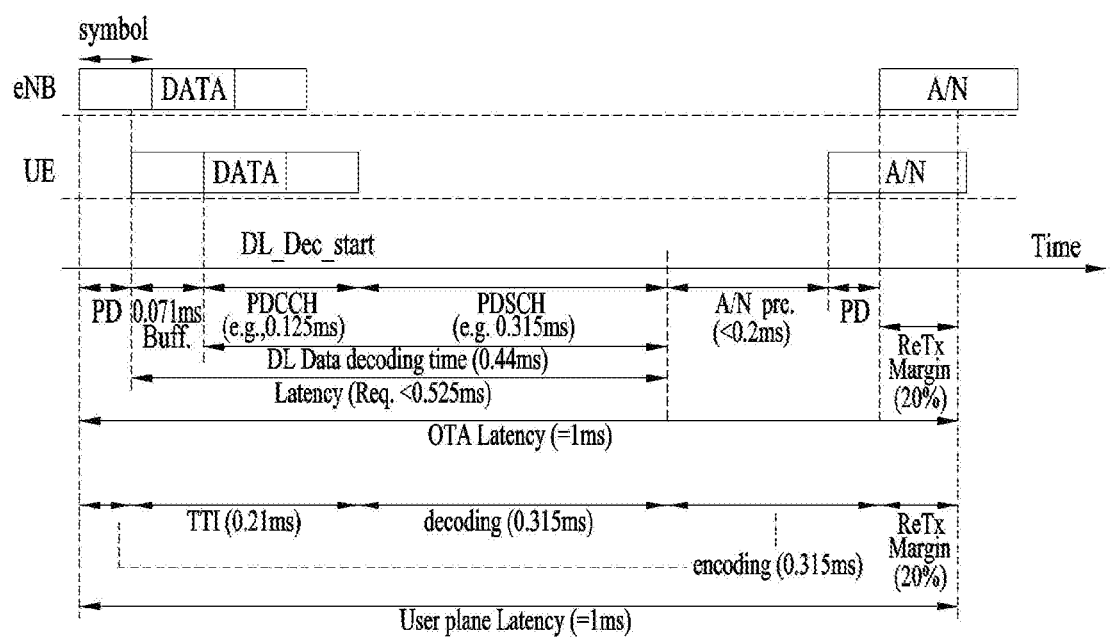
FIG. 10 illustrates an exemplary transmission time interval (TTI) length required to achieve a low latency.

FIG. 10 is an exemplary view illustrating a TTI length required to achieve a low latency.

Referring to FIG. 10, while a signal transmitted by an eNB reaches a UE, the UE transmits an A/N for the signal, and the A/N reaches the eNB, an over the air (OTA) latency occurs, which involves a DL propagation delay (PD), a buffering time, a decoding time, an A/N preparation time, a UL PD, and a retransmission margin. To satisfy a low latency, there is a need for newly designing a shortened TTI (i.e., sTTI) spanning 0.5 ms or shorter by shortening a minimum unit of data transmission, TTI. For example, if the OTA latency, which is a time period from the start of transmission of data (a PDCCH and a PDSCH) in the eNB to completion of transmission of an A/N for the data from the UE to the eNB, is to be reduced to or below 1 ms, the TTI is preferably set to 0.21 ms. That is, to reduce a user-plane (U-plane) latency to 1 ms, an sTTI may be configured in units of about three OFDM symbols.

While an sTTI is configured to include three OFDM symbols to decrease an OTA latency or a U-plane latency to 1 ms in FIG. 10, by way of example, an sTTI of a length shorter than 1 ms may also be configured. In the normal CP case, for example, there may be an sTTI with two OFDM symbols, an sTTI with four OFDM symbols, and/or an sTTI with seven OFDM symbols.

The total OFDM symbols of a default TTI or the remaining OFDM symbols of the TTI except for OFDM symbols occupied by a PDCCH region in the TTI may be divided into two or more sTTIs in the time domain in the whole or a part of frequency resources of the TTI.

Hereinafter, a default or main TTI used in a system will be referred to as a TTI or a subframe and a TTI having a time length shorter than the default/main TTI of the system will be referred to as an sTTI. The default/main TTI is also be called a basic TTI. For example, in a system using a TTI of 1 ms as a default TTI as in an LTE/LTE-A system up to now, a TTI having a time length shorter than 1 ms may be referred to as an sTTI. A TTI having a time length longer than 1 ms, for example, a TTI of 2 ms may also be used. A TTI having a time length longer than 1 ms may be referred to as a long TTI. The present invention proposes a scheme regarding a timeline of DL and UL control/data channel transmission when a TTI having a length different from the basic TTI is configured. For convenience, while a description is given focusing on a short TTI, the present invention is not limited to the short TTI and is applicable to a long TTI.

Hereinbelow, a PDCCH/PDSCH/PUSCH/PUCCH transmitted in units of a default/main TTI is referred to as a PDCCH/PDSCH/PUSCH/PUCCH, and a PDCCH/PDSCH/PUSCH/PUCCH transmitted in an sTTI or in units of an sTTI is referred to as a shortened PDCCH/shortened PDSCH/shortened PUSCH/shortened PUCCH (sPDCCH/sPDSCH/sPUSCH/sPUCCH). Although a different default/main TTI from that of the current LTE/LTE-A system may be used in a new RAT environment due to the change of numerology, embodiments of the present disclosure will be described below on the assumption that the time length of the default/main TTI is 1 ms, the default/main TTI is referred to as a legacy TTI or subframe, and a TTI shorter than the 1-ms TTI is referred to as an sTTI. Methods for transmitting/receiving a signal in a TTI and an sTTI according to the following embodiments may be applied in the same manner to a default/main TTI and an sTTI in a system based on numerology for a new RAT environment as well as a system based on the current LTE/LTE-A numerology.

Figure 11:
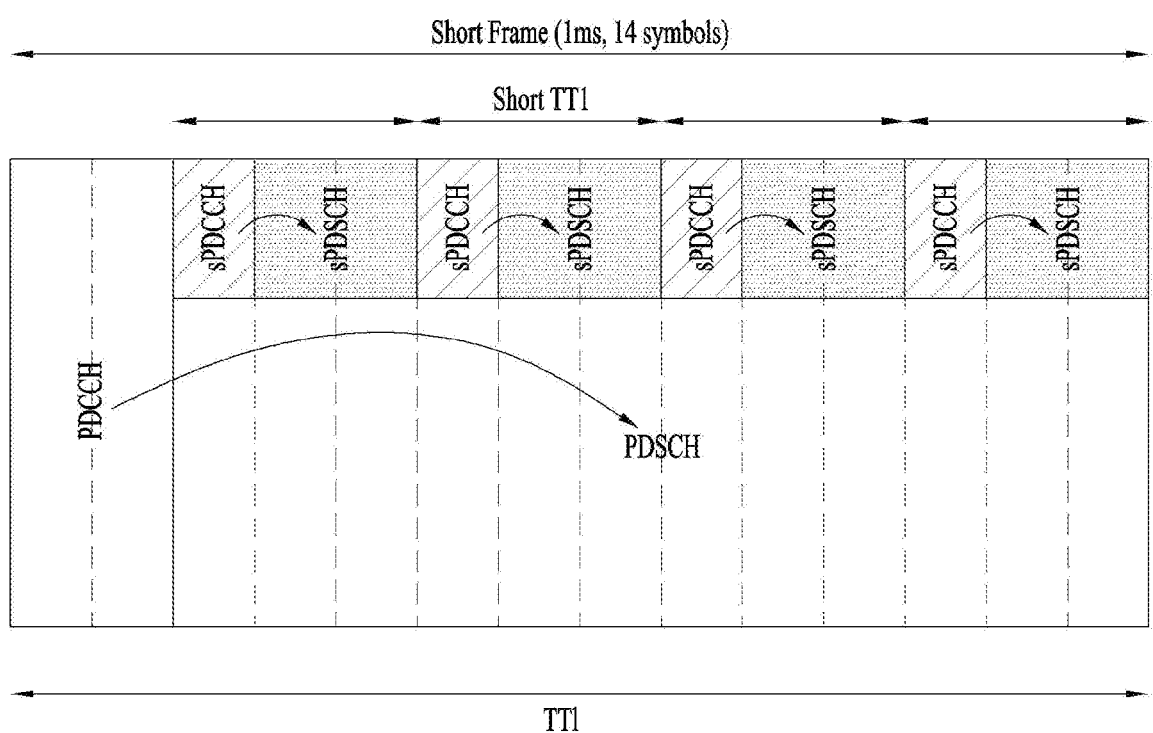
FIG. 11 illustrates an example of a shortened TTI and a transmission example of a control channel and a data channel within the shorted TTI.

FIG. 11 illustrates an example of a short TTI and a transmission example of a control channel and a data channel within the short TTI.

In a DL environment, a PDCCH for data transmission/scheduling in such an sTTI (i.e., an sPDCCH) and a PDSCH transmitted within the sTTI (i.e., an sPDSCH) may be considered. For example, referring to FIG. 11, a plurality of sTTIs may be configured using different OFDM symbols within one subframe. For example, OFDM symbols within a subframe may be split into one or more sTTIs in the time domain. OFDM symbols except for front OFDM symbols on which legacy control channels are transmitted may constitute the sTTI. The sPDCCH and the sPDSCH may be transmitted within the sTTI in a time-division-multiplexed form using different OFDM symbol regions. The sPDCCH and the sPDSCH may be transmitted within the sTTI in a frequency-division-multiplexed form using different PRB regions/frequency resources.

The present invention relates to a scheme of providing a plurality of different services by applying a different system parameter to each service or each UE in one system in order to satisfy requirements of each service. In particular, for a service/UE which is sensitive to latency, data may be transmitted as fast as possible by use of a short TTI and a response to the data is also transmitted within a short time, thereby maximally reducing latency. On the other hand, for a service/UE which is less sensitive to latency, data may be transmitted/received using a longer TTI. For a service/UE which is sensitive to power efficiency rather than latency, data may be repeatedly transmitted with the same low power or may be transmitted in units of a longer TTI. The present invention proposes a transmission scheme and a multiplexing scheme of control information and a data signal, capable of performing such an operation. The proposed schemes are associated with network transmission, UE reception, multiplexing of multiple TTIs in one UE, and multiplexing of multiple TTIs between multiple UEs.

Figure 12:
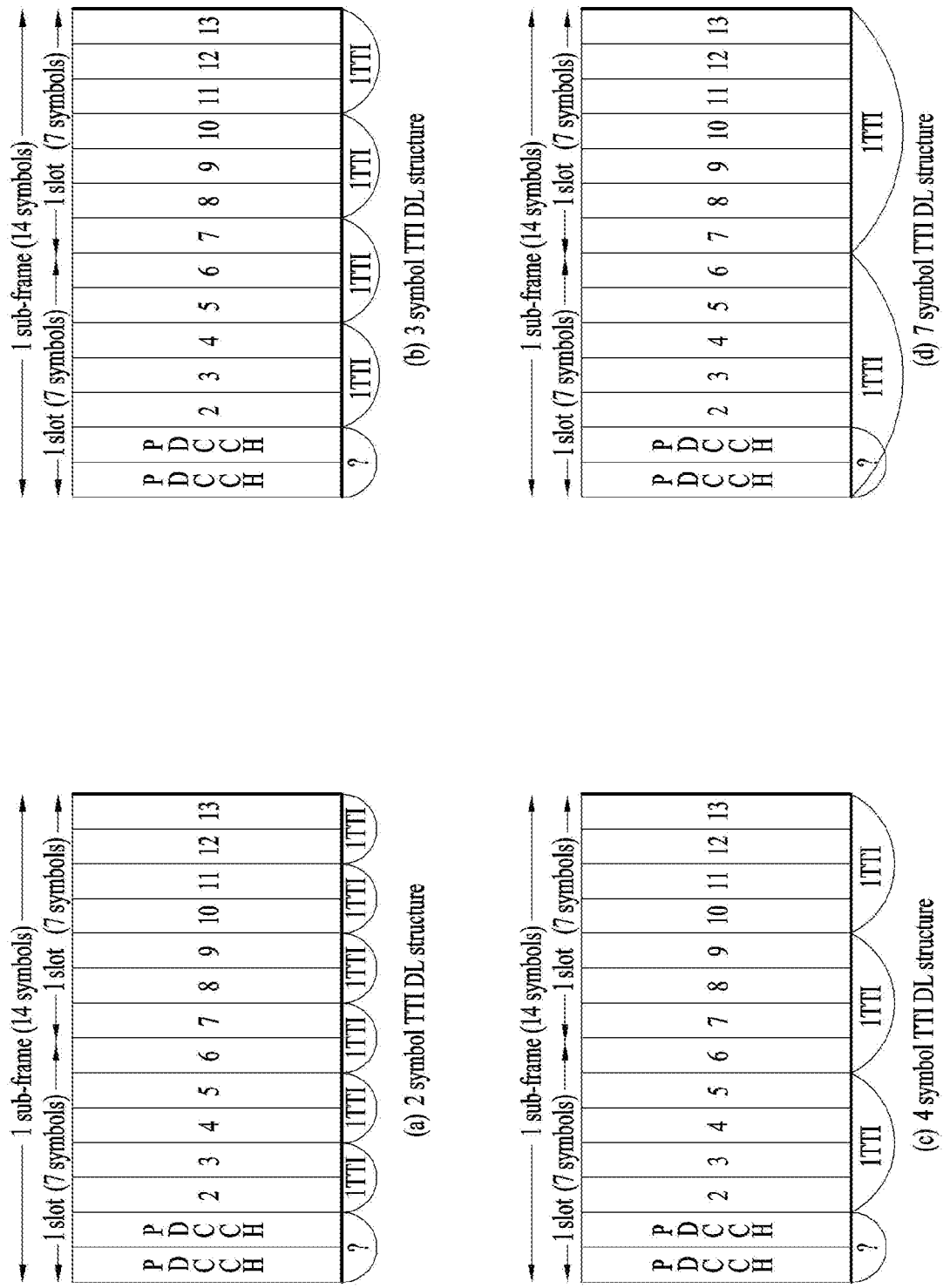
FIG. 12 illustrates examples of DL short TTIs configured within a legacy subframe.

FIG. 12 illustrates examples of DL short TTIs configured within a legacy subframe.

In legacy LTE/LTE-A, a 1-ms subframe includes 14 OFDM symbols in the case of a normal CP. When a TTI of a unit shorter than 1 ms is configured, a plurality of TTIs may be configured within one subframe. As illustrated in FIG. 12, each TTI may include, for example, two symbols, three symbols, four symbols, or seven symbols. Although not illustrated in FIG. 12, one symbol may be considered as a TTI. If one symbol constitutes one TTI unit, 12 TTIs may be configured within a 1-ms default TTI under the assumption that a legacy PDCCH can be transmitted within two OFDM symbols. Likewise, assuming that the front two OFDM symbols constitute a legacy PDCCH region, if two symbols constitute one TTI unit, six TTIs may be configured within the default TTI, if three symbols constitute one TTI unit, four TTIs may be configured within the default TTI, and, if four symbols constitute one TTI unit, three TTIs may be configured within the default TTI. In other words, it may be assumed that the legacy PDCCH region is a separate TTI and the remaining symbols within a subframe may be allocated to short TTI(s). That is, if n (where n=0, 1, 2, 3, or 4) symbols are used for the legacy PDCCH, the n symbols are configured as one TTI and the other K-n OFDM symbols are configured as sTTI(s) capable of actually transmitting an sPDCCH and an sPDSCH. In this case, K is a value indicating the number of OFDM symbols constituting one subframe in an LTE system and is determined depending on CP length. In this specification, the present invention is described based on a subframe including 14 OFDM symbols under the assumption of the normal CP.

If 7 symbols are configured as one TTI, one TTI consisting of front seven symbols including the legacy PDCCH region and one TTI consisting of rear seven symbols may be configured. In this case, if one TTI includes 7 symbols, a UE supporting a short TTI assumes that data on front two OFDM symbols on which the legacy PDCCH is transmitted has been punctured or rate-matched with respect to a TTI (i.e., a TTI of the first slot) located at the front part of one subframe (i.e., a default TTI) and that a data channel and/or a control channel thereof are transmitted on the next 5 symbols. In contrast, with respect to a TTI (i.e., a TTI of the second slot) located at the rear part of one subframe, the UE assumes that the data channel and/or the control channel may be transmitted on all of the 7 symbols without having a rate-matched or punctured resource region.

Puncturing a channel in a specific resource means that signals of the channel are mapped to the specific resource in a resource mapping process of the channel but the channel is transmitted while excluding a signal mapped to a punctured resource. In other words, the punctured specific resource is counted as a resource of the channel in the resource mapping process of the channel but the signal mapped to the specific resource among the signals of the channel is not actually transmitted. A reception device of the channel receives, demodulates, or decodes the channel under the assumption that the signal mapped to the punctured specific resource has not been transmitted. In contrast, rate-matching the channel in the specific resource means that the channel is not mapped to the specific channel in the resource mapping process of the channel and thus is not used for transmission. In other words, the rate-matched specific resource is not counted as the resource of the channel in the resource mapping process of the channel. The reception device of the channel receives, demodulates, or decodes the channel under the assumption that the rate-matched specific resource is not used to map and transmit the channel.

If a UE capable of supporting a short TTI can support the legacy LTE system, the UE needs to monitor a PDCCH in every subframe. A PCFICH indicating the length of the PDCCH is transmitted in every subframe and the UE may identify a time length of the legacy PDCCH in a corresponding subframe by decoding the PCFICH in every subframe. The present invention proposes a method of identifying, by the UE, an sTTI length and a subframe structure in consideration of the legacy PDCCH.

The sTTI length may be semi-statically signaled to the UE through higher layer signaling or may be dynamically signaled by an eNB through DCI. The UE may identify the sTTI length by decoding the PDCCH or an additional channel as well as by decoding the PCFICH. The eNB may signal the sTTI length to the UE through the DCI as needed according to traffic and service characteristics of the UE. The value of the PCFICH, i.e., the length of the legacy PDCCH, may be set to a specific default value regardless of whether the PDCCH is actually transmitted.

*Short TTI Structure Signaling Scheme A

A scheme of configuring an sTTI within one subframe is described. The eNB may signal all of the length(s) of sTTI(s) within a subframe in consideration of the PCFICH. For example, the eNB may configure a plurality of sTTIs within a basic subframe under the assumption that PCFICH=0, i.e., there is no legacy PDCCH. To avoid complexity of a system, sTTIs are defined only within one subframe and are not defined over a plurality of subframes. In this case, a configuration set for a possible TTI structure may be defined. When one subframe includes 14 OFDM symbols, for example, the following configurations may be defined:

Configuration 1={2, 2, 2, 2, 2, 2, 2}
Configuration 2={4, 3, 4, 3},
Configuration 3={4, 7, 3},
Configuration 4={5, 3, 3, 3},
. . .

Among the above defined configurations, the eNB may inform the UE of the TTI structure by signaling a specific configuration value.

Alternatively, the eNB may signal the sTTI structure within a subframe to the UE under the assumption that the PCFICH has a specific value other than 0. Even in this case, a plurality of configurations may be defined according to an sTTI length as described above. The eNB may signal the TTI structure and the sTTI length within a subframe to the UE by signaling a specific configuration.

If the UE is aware of the sTTI length and structure by receiving information about the sTTI length and structure from the eNB and if the UE receives the PCFICH indicating the length of the legacy PDCCH, the UE may identify a location at which the sPDSCH is actually started using the information about the sTTI length and structure and using the PCFICH. For example, if the value of the PCFICH actually decoded by the UE is n, the UE subtracts n symbols from the first sTTI in a subframe in which the PCFICH is present. That is, the UE assumes that the front n symbols in the first sTTI have been rate-matched. If n is greater than the length of the first sTTI, the UE assumes that all symbol(s) corresponding to the value of the PCFICH in the TTI structure configured for the UE have been rate-matched. In this case, a default value of the PCFICH assumed by the UE may be separately configured. The UE may assume that data for an sTTI which is first started after the legacy PDCCH in every subframe is rate-matched according to the TTI structure depending on the default value of the PCFICH and to a value obtained by actually decoding the PCFICH. If the PCFICH is not transmitted, the UE assumes that data on symbol(s) corresponding to the default value for the sTTI which is first started after the PDCCH is rate-matched.

*Short TTI Structure Signaling Scheme B

As another scheme of signaling the sTTI structure, the eNB may signal the sTTI structure by informing the UE of the sTTI length and/or the number of sTTIs. In this case, the TTI structure may differ according to a scheme considering the PCFICH.

>Option 1)

The sTTI length within a subframe may be signaled to the UE under the assumption that the length of symbols occupied by the legacy PDCCH, i.e., the PCFICH, has a specific value. For example, when the eNB signals to the UE that the short TTI length in a subframe is four symbols under the assumption that PCFICH=0, the UE may configure the sTTI starting from the first symbol (or the rearmost symbol) of the subframe. If one subframe includes 14 symbols, the UE may be automatically aware that the sTTIs in the subframe are configured in order of {4, 4, 4, 2} symbols (or {2, 4, 4, 4} symbols) only by the "short TTI length in the subframe". For example, referring to FIG. 12(b), FIG. 12(b) illustrates a basic TTI structure that can be assumed by the UE when the eNB signals to the UE that the sTTI length is three symbols under the assumption that PCFICH=2. In this case, when a value acquired by decoding the PCFICH is 3, the UE may assume that an sTTI following immediately after the PDCCH includes two symbols. That is, the UE may recognize that symbols obtained by subtracting symbols occupied by the PDCCH from the sTTI length signaled thereto as an sTTI thereof. Alternatively, the UE may assume that the sPDSCH/sPDCCH corresponding to a symbol length occupied by the legacy PDCCH from the sTTI length signaled thereto is rate-matched.

For example, if one subframe includes N symbols and the eNB signals to the UE that the sTTI length is k symbols, the UE may be aware of an sTTI configuration in the one subframe through such signaling. That is, m sTTIs (where m is an arbitrary integer) of a k-symbol length and one sTTI of a (N−m*k)-symbol length are configured in one subframe and the sTTI of the (N−m*k)-symbol length may be located at the foremost or rearmost of the subframe through scheduling.

An sPDSCH start point in the sTTI located at the foremost of the subframe differs according to a PCFICH value decoded by the UE. That is, the sTTI length is influenced starting from the front of the subframe. If the PCFICH value actually decoded by the UE is n, n symbols from an sTTI length which is first started in the subframe are excluded from the first sTTI. The UE assumes that data on all symbols(s) indicated by the PCFICH in the sTTI structure of the subframe has been rate-matched. In this case, the default value of the PCFICH assumed by the UE may be separately configured. The UE may assume that data for an sTTI which is first started after the PDCCH in every subframe is rate-matched according to an actual PCFICH decoding value. In no PCFICH is transmitted, the UE assumes that data on symbol(s) corresponding to the default value for the sTTI which is first started after the PDCCH is rate-matched.

>Option 2)

The eNB may signal to the UE that a short TTI length in a subframe is four symbols. The UE decodes the PCFICH and assigns an sTTI according to the sTTI length signaled by the eNB among the remaining symbols excluding symbol(s) indicated by the PCFICH in a subframe in which the PCFICH is present. For example, when PCFICH=3 and one subframe includes 14 OFDM symbols, the UE configures an sTTI capable of transmitting the sPDSCH based on 11 symbols. For example, when the sTTI corresponding to the sTTI length signaled to the UE is configured, if the sTTI length is allocated starting from a front symbol, the UE configures sTTIs including symbols in order of {4, 4, 3} symbols except for three PDCCH transmission symbols in the subframe. Conversely, if the sTTI length signaled to the UE starting from the rearmost symbol of the subframe is assigned, the UE configures sTTIs including symbols in order of {3, 4, 4} symbols in the subframe.

In Option 2, a timing at which the sTTI is started may differ in every subframe by the PCFICH. UL sTTI(s) may also be aligned according to a DL sTTI structure. A symbol length corresponding to the PCFICH value decoded by the UE may be configured as an additional UL sTTI and a UL sTTI structure after the additional UL sTTI may be determined according to the DL sTTI structure depending on the PCFICH. Even in Option 2, the default PCFICH value may be used. When the PCFICH is not transmitted, the UE may assume that data on symbol(s) corresponding to the default PCFICH value is rate-matched and a UL TTI may also be aligned according to the DL sTTI structure depending on the default PCFICH value.

Separately from and/or in association with the above-mentioned schemes of signaling the sTTI length and the TTI structure, how the UE recognizes the legacy PDCCH and how the UE handles the legacy PDCCH will be described hereinbelow. When the UE is aware of a legacy PDCCH length, i.e., when the UE receives the PCFICH, it is necessary to define whether the legacy PDCCH length should be recognized as an additional sTTI by the UE.

*Scheme that a Legacy PDCCH Symbol Duration is Recognized as an Additional sTTI by the UE.

This scheme is applicable to Option 2 of "Short TTI structure signaling scheme A" and "Short TTI structure signaling scheme B". The UE may recognize a time of legacy PDCCH symbol(s) as one short TTI. This may affect a UL short TTI configuration. UL short TTI(s) may be configured equally to the DL short TTI configuration. However, the first UL sTTI length of a symbol length corresponding to the PCFICH decoded by the UE may be determined. If each short TTI start timing in DL is changed, each short TTI start point in UL may also be changed.

Figure 13:
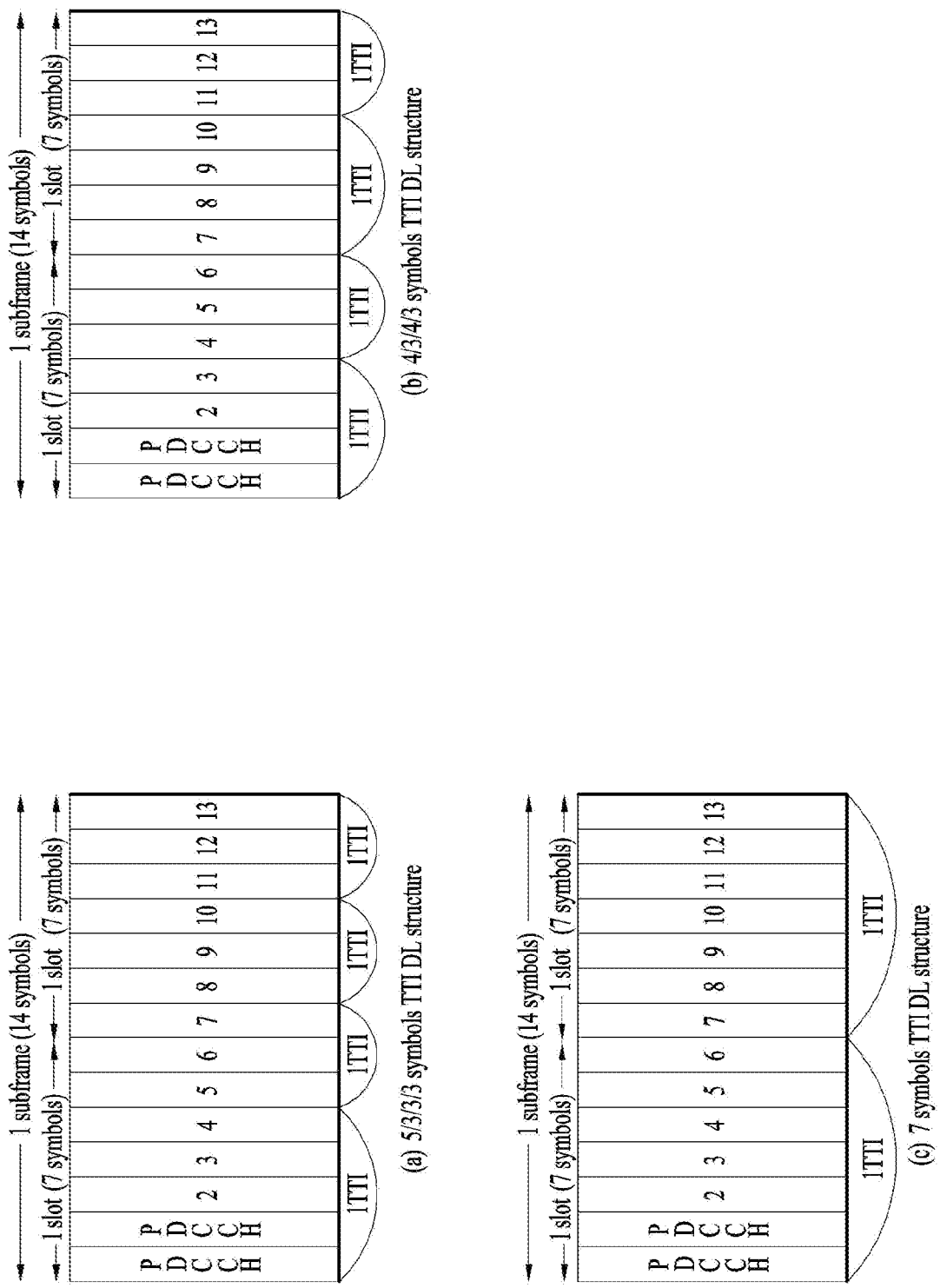
FIG. 13 illustrates other examples of DL short TTIs configured in a legacy subframe.

*Scheme that a Legacy PDCCH Symbol Duration is not Recognized as an sTTI by the UE FIG. 13 illustrates other examples of DL sTTIs configured in a legacy subframe.

Unlike the scheme of recognizing the legacy PDCCH symbol duration as an additional sTTI, the legacy PDCCH symbol duration may not be recognized as the sTTI. This scheme may be applied to both "Short TTI structure signaling scheme A" and "Short TTI structure signaling scheme B". The scheme particularly includes the legacy PDCCH in an sTTI located at the foremost or a front part of a subframe. According to this scheme, even if the legacy PDCCH length is changed, the sTTI length may not be changed. In addition, an sTTI length and a start timing in UL may not be affected by the legacy PDCCH length. Particularly, a legacy PDCCH region may be used as a transmission region of the sPDSCH/sPDCCH in an sTTI which is present immediately after the legacy PDCCH region. FIG. 13 illustrates available TTI structures according to this scheme.

Figure 14:
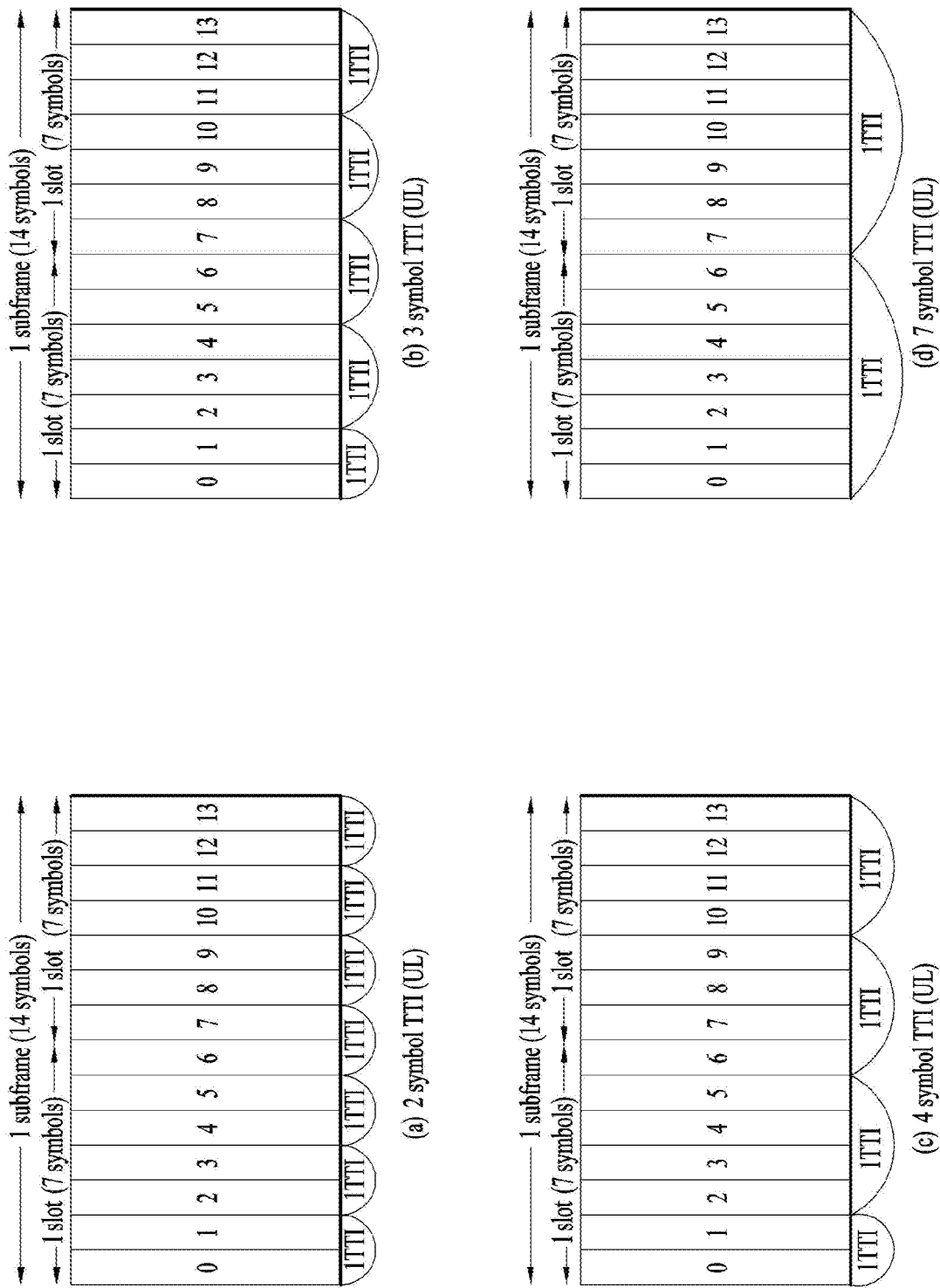
FIG. 14 illustrates examples of UL short TTIs configured in a legacy subframe.

FIG. 14 illustrates examples of UL short TTIs configured in a legacy subframe.

Even in UL, a 1-symbol TTI, a 2-symbol TTI, a 3-symbol TTI, a 4-symbol TTI, or a 7-symbol TTI may be configured. Unlike DL with symbols dedicated to a legacy PDCCH, since UL does not include symbols dedicated to legacy control/data transmission, more TTIs may be configured in the time domain in UL. Accordingly, the number of DL TTIs matches the number of UL TTIs and a UL TTI corresponding to the legacy PDCCH region may be separately configured in consideration of the fact that the legacy PDCCH can schedule an sTTI PUSCH. In this case, the number of symbols constituting a UL time region corresponding to the legacy PDCCH may be set to be the same as the number of symbols constituting the legacy PDCCH region. For example, if a PCFICH indicating a time length of the legacy PDCCH is 1, one start symbol of a UL subframe corresponding to a DL subframe being PCFICH=1 may be configured as a TTI corresponding to the legacy PDCCH region. As another example, if PCFICH=2, two start symbols of the UL subframe corresponding to a DL subframe being PCFICH=2 may be configured as the TTI corresponding to the legacy PDCCH region.

If UL symbols of a number corresponding to the legacy PDCCH are configured as the UL TTI, symbol(s) used for transmission of the legacy PDCCH may be assumed to be an additional DL TTI. Thus, the number of DL TTIs may be equal to the number of UL TTIs. However, if the TTI length is 7 symbols, the legacy PDCCH region is not assumed to be the additional TTI and, even in UL, an additional UL TTI for the legacy PDCCH region is not assumed.

The following table illustrates a UL/DL TTI configuration. The number of UL TTIs and the number of DL TTIs and a connection relationship between UL and DL according to a TTI length may be defined in the following table.

sion so that a TTI which is an actual transmission time of data is three symbols. Four TTIs are configured in FIG. 15(c) and the last symbol may be reserved for SRS transmission. In FIG. 15(c), the SRS and data may be multiplexed on the last symbol.

Even when two PUSCHs are transmitted in each of two TTIs, since DM-RSs for the two PUSCHs are transmitted on

TABLE 10

| | DL | | UL | |
|---|---|---|---|---|
| TTI size (number of symbols per TTI) | TTI configuration | Total number of TTIs | TTI configuration | Total number of TTIs |
| 1 symbols | 12 TTIs of one symbol length TTI and 1 TTI of two symbol length TTI (legacy PDCCH) | 13 TTIs | 12 TTIs of one symbol length TTI and 1 TTI of two symbol length TTI corresponding legacy PDCCH region | 13 TTIs |
| 2 symbols | 6 TTIs of two symbol length TTI and 1 TTI of two symbol length TTI (legacy PDCCH) | 7 TTIs | 6 TTIs of two symbol length TTI and 1 TTI of two symbol length TTI corresponding legacy PDCCH region | 7 TTIs |
| 3 symbols | 4 TTIs of three symbol length TTI and 1 TTI of two symbol length TTI (legacy PDCCH) | 5 TTIs | 4 TTIs of three symbol length TTI and 1 TTI of two symbol length TTI corresponding legacy PDCCH region | 5 TTIs |
| 4 symbols | 3 TTIs of four symbol length TTI and 1 TTI of two symbol length TTI (legacy PDCCH) | 4 TTIs | 3 TTIs of four symbol length TTI and 1 TTI of two symbol length TTI corresponding legacy PDCCH region | 4 TTIs |
| 7 symbols | 2 TTIs of seven symbol length TTI | 2 TTIs | 2 TTIs of seven symbol length TTI | 2 TTIs |

Referring to FIGS. 5 to 8, a legacy UL channel is configured in one subframe in the time domain and a DM-RS (e.g., a PUCCH RS or a PUSCH RS) of the UL channel is transmitted on determined symbols among symbols in the subframe. The UL DM-RS is present in a subframe in which the UL channel is present. Locations of symbols in the subframe used to transmit the UL DM-RS differ according to UL channel type and CP type but do not differ according to subframe.

Similarly to a legacy UL DM-RS, if the UL DM-RS is present in every TTI in which the UL channel is present, an sTTI configured by a small number of symbols, particularly, a 1-symbol TTI or a 2-symbol TTI, increases DM-RS overhead, so that use of the sTTI may cause reduction of UL data rate. Therefore, the present invention proposes a scheme of sharing the DM-RS in UL between adjacent TTIs. In other words, each TTI may be configured while the DM-RS is shared between adjacent TTIs.

Figure 15:
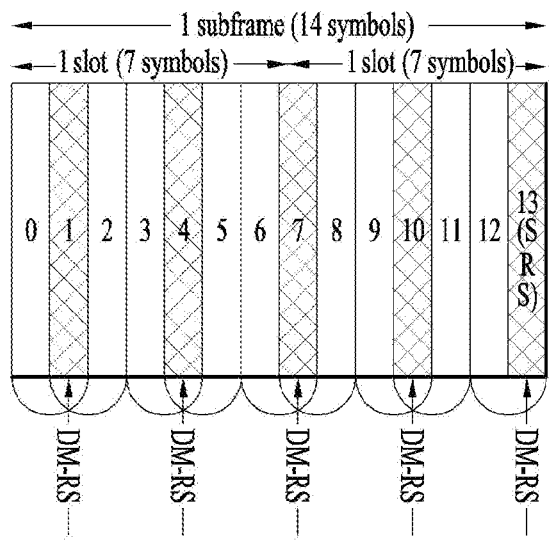
FIG. 15 illustrates a UL RS transmission method according to the present invention.
Figure 15:
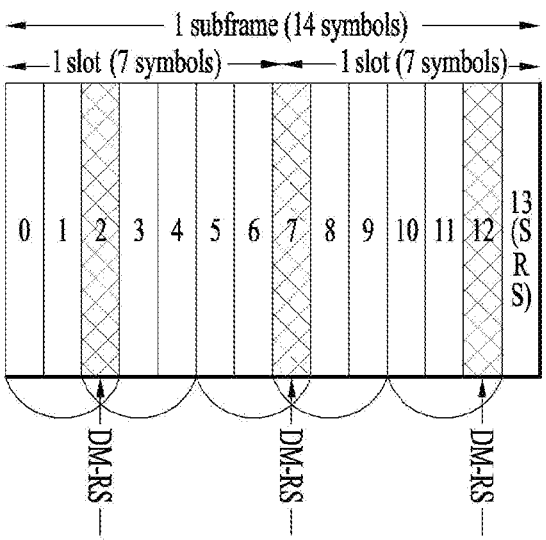
Figure 15:
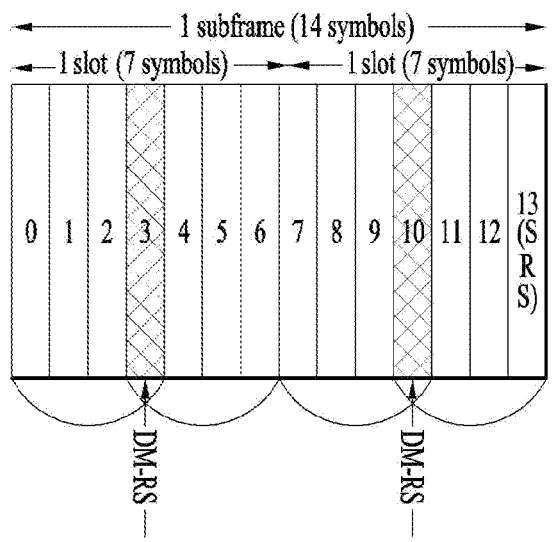

FIG. 15 illustrates a UL RS transmission method according to the present invention.

Referring to FIG. 15, a symbol located at the middle of adjacent TTIs may be shared by the adjacent TTIs to transmit a DM-RS. If adjacent TTIs share a specific symbol to transmit the DM-RS, more TTIs than when a DM-RS symbol is not shared may be configured in the same time resource. In FIG. 15(a), a ½ symbol TTI means that one symbol is used for data transmission but a TTI which is an actual transmission time of data including the DM-RS is 2 symbols. If the ½ symbol TTI is configured, a maximum of 9 TTIs may be configured in a subframe including 14 symbols. The last symbol of the subframe may be used to transmit the DM-RS and an SRS. Likewise, in FIG. 15(b), a ⅔ symbol TTI means that two symbols are used for data transmission but one symbol is shared for DM-RS transmisone symbol, a UL DM-RS resource is efficiently used compared with the case in which the DM-RS is transmitted in each of the two TTIs according to a legacy system. Since the two sTTIs share a DM-RS symbol time, more UL sTTIs than when sTTIs do not share the DM-RS symbol time may be configured in one basic TTI.

If a specific symbol is shared for UL transmission between adjacent TTIs for DM-RS transmission, the number of UL TTIs may differ from the number of DL TTIs. In a subframe having 14 symbols, seven 2-symbol DL TTIs are generated, whereas nine ½-symbol UL TTIs are generated as illustrated in FIG. 15(a). Therefore, if it is desired to match the number of UL TTIs to the number of DL TTIs, TTI of various lengths need to be multiplexed in one subframe. For example, the UL TTIs may have different lengths in one subframe while one subframe has seven UL TTIs. Multiplexing TTIs of various lengths in one subframe means that the lengths of TTIs vary in one subframe and means that a UL TTI length may differ from a DL TTI length and the number of UL TTIs may differ from the number of DL TTIs, in one subframe or in a specific time unit duration. The meaning that the TTI length and the number of TTIs in UL differ from those in DL represents that a unit TTI length and the number of TTIs simultaneously scheduled differ in UL and DL within a given time duration.

When TTIs of various lengths are multiplexed in one subframe and the number of UL TTIs needs to match the number of DL TTIs, a UL TTI corresponding to a UL grant transmitted in a legacy PDCCH region may be the first TTI in a UL subframe corresponding a DL subframe in which the legacy PDCCH region is present. That is, a UL TTI corresponding to DL TTI n may be UL TTI n of a corresponding UL subframe.

When an sTTI is introduced, the number of TTIs in one subframe and a connection relationship of UL and DL may be fixed as shown in, for example, Table 10. However, when the length of a legacy PDCCH region varies, a TTI length after legacy PDCCH symbol(s) needs to be adjusted. For example, in Table 10, the number of TTIs is designated on the premise that the legacy PDCCH uses two OFDM symbols. However, if the legacy PDCCH region occupies three symbols, up to 6 2-symbol TTIs are not generated. Accordingly, the TTI length after the legacy PDCCH region needs to be changed depending on the length of the legacy PDCCH region.

As the simplest method of changing the TTI length considering the legacy PDCCH, the number of symbols(s) except for symbols that the legacy PDCCH uses in a TTI of a specific location is considered as the number of TTIs. For example, referring to FIG. 12(a), FIG. 12(a) illustrates an sTTI DL structure in which 6 2-symbol TTIs are generated in a subframe under the assumption that PCFICH=2. However, when PCFICH=3, symbols obtained by subtracting one symbol from a 2-symbol TTI immediately after the first 2-symbol TTI are one TTI and the lengths(s) of the next TTI(s) may be maintained. That is, when N-symbol TTIs are configured in a subframe and the number of symbols occupied by the legacy PDCCH is greater than N, a specific n-th TTI in the subframe may include symbol(s) obtained by subtracting the number of symbols additionally used by the legacy PDCCH.

As another method of changing the TTI length considering the legacy PDCCH, a specific n-th TTI may be configured by adding symbols of a number less used by the legacy PDCCH. For example, when an actual PCFICH is 1 in an sTTI DL structure under the assumption that PCFICH=2, a specific n-th TTI in a subframe may include symbols obtained by adding the number of symbols less used by the legacy PDCCH, i.e., one symbol. Symbols not used for legacy PDCCH transmission among symbols in the first sTTI may be added to the second TTI immediately after the first sTTI in which the legacy PDCCH is present so that the length of the second TTI may increase. Thus, the TTI length may be changed in units of every subframe without wasting resources.

Even if the number of UL TTIs matches the number of DL TTIs, it may be difficult to equalize a UL TTI length with a DL TTI length. A TTI length for DL transmission may vary in one subframe and a TTI length for UL transmission may also vary in one subframe. In other words, TTIs having different lengths may coexist in both DL and UL in one subframe.

Table 10 proposes a scheme of matching the UL TTI length and the DL TTI length as equally as possible and equalizing the number of UL TTIs with the number of DL TTIs. However, in order to freely operate a system according to traffic characteristics of UL and DL and sensitivity to latency of each UE, the UL TTI length may differ from the DL TTI length. That is, the UL TTI length may be set to be shorter than the DL TTI length to raise a DL data rate by rapidly transmitting data and a response of UL and thus rapidly increasing a TCP window size. If the UE is sensitive to latency and can occupy all (system/channel) bands during a short time, DL data for the UE may be transmitted over all bands during a short TTI. As a result, the UL TTI length and the DL TTI length may independently vary according to a degree of resource usage and according to service and traffic characteristics demanded by the UE, so that the system may be flexibly operated. The TTI length may differ in UL and DL and thus the number of UL TTIs and the number of DL TTIs may differ with respect to the same time.

<A. UL/DL Transmission Timing>

Hereinafter, a mapping scheme between a DL TTI and a UL TTI is proposed in the case in which the number of DL TTIs differs from the number of UL TTIs with respect to the same time length. For example, when the number of DL TTIs and the number of UL TTIs in 1 ms or x ms which is a reference time are N and M, respectively, N and M may differ. In this case, a table for mapping DL/UL timings may be configured with respect to the N DL TTIs and M UL TTIs.

Assume that a DL TTI index is n and a UL TTI index is m. If a UL grant is received in TTI n, a PUSCH is transmitted in TTI n+4 in a legacy LTE FDD system. However, according to the present invention, a UL TTI length may be different from a DL TTI length and the number of UL TTIs within a predetermined time may be different from the number of DL TTIs within the predetermined time. Therefore, it may be difficult to perform, in TTI n+4, UL transmission according to the UL grant received in TTI n. A legacy interval (e.g., four TTIs) between the UL grant and corresponding UL transmission is a value considering a propagation delay, a decoding time of a signal received by the UE, and an encoding time of a signal desired by the UE to be transmitted on the premise that the UL TTI length is equal to the DL TTI length.

In the present invention, a decoding time budget of a reception signal associated with UL transmission and an encoding time budget of a signal desired to be transmitted are separately considered in order to determine a UL transmission timing. Since the decoding time depends on the size of the reception signal (e.g., a transport block size (TBS)), a TTI length, etc., a decoding time is determined based on the TTI length of the reception signal. Likewise, since an encoding time depends on the size of the transmission signal and the TTI length, the encoding time is determined based on the TTI length of the transmission signal.

Assume that the decoding time budget is d TTIs and the encoding time budget is e TTIs. When the UE receives the UL grant in TTI n, a timing at which decoding of the UL grant is ended may be TTI n+d. The time unit of the decoding time budget conforms to a TTI of a reception signal. That is, a time corresponding to the d (DL) TTIs is considered as the decoding time budget. After ending decoding of the UL grant, the UE prepares for PUSCH transmission for the UL grant and encodes the PUSCH so that a timing at which the UE actually transmits the PUSCH is UL TTI m+e when the last UL TTI overlapping DL TTI n+d is UL TTI m. While only an example of transmitting the UL grant and the PUSCH for the UL grant has been described, this relationship may also be used to determine a UL transmission timing for specific DL signal reception and a DL transmission timing for specific UL signal reception. Hereinafter, the relationship between the DL/UL timings when the number of DL TTIs and the number of UL TTIs differ will be proposed in detail. For convenience of description, the present invention is described under the assumption that the decoding time budget d is two TTIs and the encoding time budget e is two TTIs. Herein, e may be a value other than two.

Figure 16:
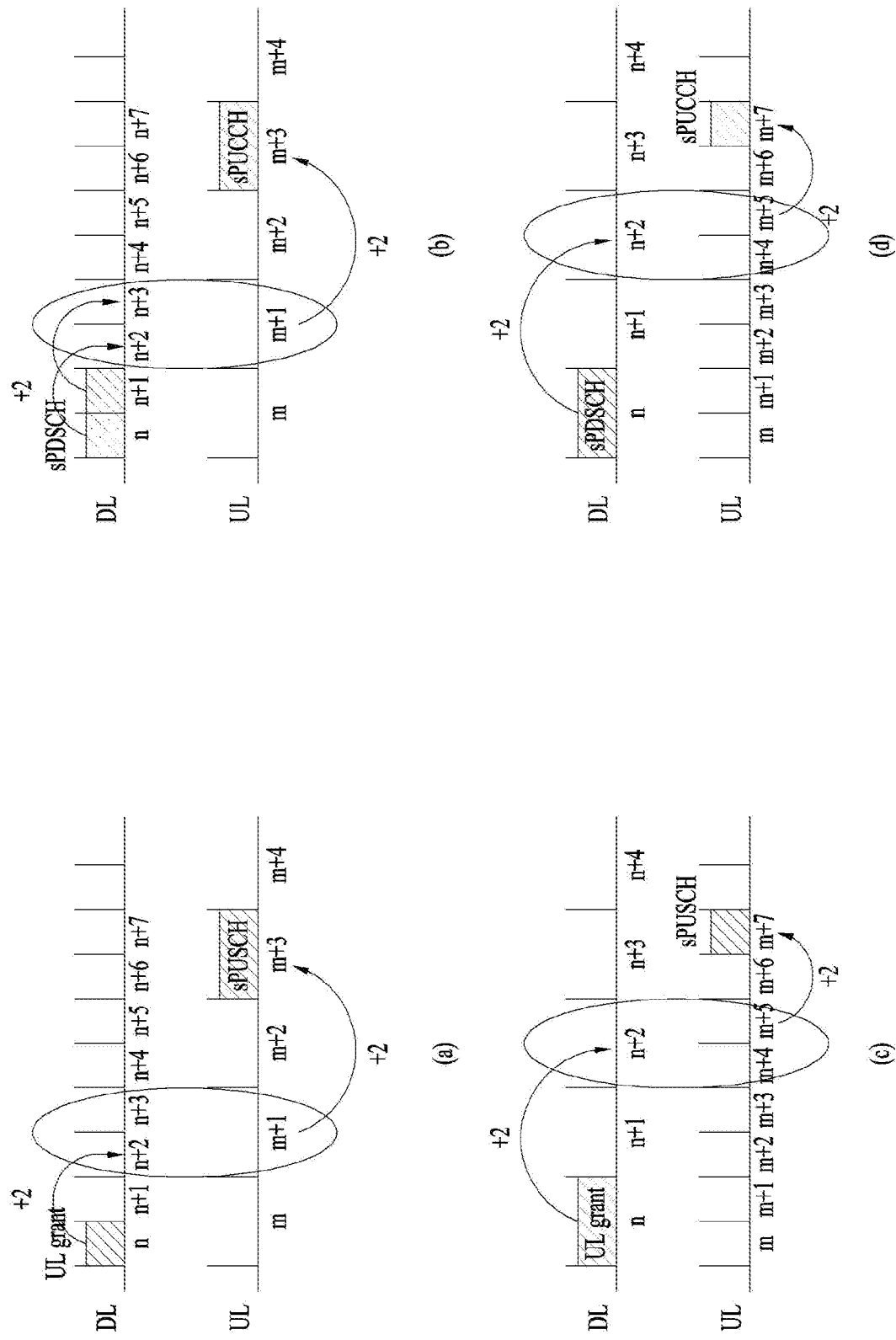
FIG. 16 illustrates a UL transmission timing according to the present invention.

FIG. 16 illustrates a UL transmission timing according to the present invention.

1) Number N of DL TTIs≥Number M of UL TTIs

If the number of DL TTIs is greater than the number of UL TTIs during a predetermined time duration, multiple DL TTIs may overlap with one UL TTI. Referring to FIGS. 16(a) and 16(b), for example, DL TTI n and DL TTI n+1, which are consecutive two DL TTIs, may overlap with one UL TTI m in the time domain. Since the number of UL TTIs is less than the number of DL TTIs, a UL TTI corresponding to a plurality of DL TTIs may be only one in an extreme case.

If the UL grant is transmitted in DL TTI n, it may be generally assumed that processing (such as decoding etc.) for the UL grant is completed in DL TTI n+2. A transmission timing of a PUSCH corresponding to the UL grant may be determined based on an index of the last UL TTI overlapping DL TTI n+2. For example, referring to FIGS. 16(a) and 16(b), if the last UL TTI overlapping DL TTI n+2 is UL TTI m+1, the transmission timing of the PUSCH is determined based on UL TTI m+1. Therefore, the PUSCH may be transmitted in TTI m+3. As illustrated in FIG. 16(b), PUSCHs for UL grants received in multiple DL TTIs may be transmitted in one UL TTI. That is, since N is greater than M, multiple DL TTIs may be mapped to one UL TTI. PUCCHs for PDSCHs received in multiple DL TTIs may be transmitted in a multiplexed and/or bundled form in one UL TTI.

2) Number N of DL TTIs<Number M of UL TTIs

If the number of UL TTIs is greater than the number of DL TTIs during a predetermined time duration, a UL grant for multiple UL TTIs may be transmitted in one DL TTI. For example, a UL grant for a plurality of UL TTIs may be provided in one DL TTI in the form of a bitmap consisting of bits in one-to-one correspondence to UL TTI indexes.

If the UL grant is transmitted in DL TTI n, it may be generally assumed that processing (such as decoding etc.) for the UL grant is completed in DL TTI n+2. The transmission timing of a PUSCH corresponding to the UL grant may be determined based on an index of the last UL TTI overlapping DL TTI n+2. For example, when the last UL TTI overlapping DL TTI n+2 is UL TTI m', it may be assumed that the PUSCH is transmitted in the first UL TTI after UL TTI m'+2. Referring to FIGS. 16(c) and 16(d), the UL grant is transmitted in DL TTI n. If the last UL TTI overlapping DL TTI n+2 is UL TTI m+5, the PUSCH according to the UL grant is transmitted in UL TTI m+7.

Alternatively, in the case of sPUCCH transmission, since the number of UL TTIs is greater than the number of DL TTIs, it may be assumed that a transmission timing is determined based on the UL TTI m+5 which is the fourth UL TTI starting from the last UL TTI m+1 overlapping a DL TTI in which the sPDSCH is transmitted.

As described above, the decoding time budge of d TTIs considering propagation delay and data decoding of a reception end and the encoding time budget of e TTIs considering data generation and an encoding time of a transmission end may be secured. If the UL TTI length is different from the DL TTI length, each of the decoding time budget and the encoding time budget needs to be considered. A UL/DL channel transmission timing corresponding to the decoding time budget and the encoding time budget should be determined in consideration of each of the decoding time budget and the encoding time budget.

Hereinbelow, $TTI_{sDL}$ and $TTI_{sUL}$ indicate a unit transmission time of DL and a unit transmission time of UL, respectively. That is, $TTI_{sDL}$ and $TTI_{sUL}$ indicate a DL TTI length and a UL TTI length, respectively. Hereinbelow, $T_{sDL}$ and $T_{sUL}$ indicate an index of a DL TTI in which the eNB starts DL transmission and an index of a UL TTI in which the UE starts UL transmission, respectively. $TTI_{DL}$ and $TTI_{UL}$ represent a DL TTI length and a UL TTI length, respectively. A decoding time and an encoding time for DL/UL transmission may be generalized as follows.

Decoding time for DL channel: $d*TTI_{DL}$
Decoding time for UL channel: $d*TTI_{UL}$
Encoding time for DL channel: $e*TTI_{DL}$
Encoding time for UL channel: $e*TTI_{UL}$ A time consumed to decode a reception signal is proportional to a time length during which the reception signal is received and a time consumed to encode a transmission signal is proportional to a time length during which the transmission signal is transmitted. $TTI_{DL}$ and $TTI_{UL}$ values may differ according to channel lengths of DL and UL, respectively. For example, a time length occupied by a PDCCH may differ from a time length occupied by a PDSCH. Upon calculating an encoding time and a decoding time of each channel, the encoding time and the decoding time may be calculated in proportion to a time length occupied by each channel Upon determining UL PUSCH and PUCCH transmission timings for the PDCCH and the PDSCH, the encoding time and the decoding time may be considered.

Generally, the decoding time budget and the encoding time budget may be equally set, i.e., d=e. Then, UL/DL transmission timings may be determined as follows. In particular, a transmission timing of an sPUSCH for an sPDCCH and a transmission timing of an sPUCCH for an sPDSCH may be determined as follows. An actual transmission timing of the sPUSCH and an actual transmission timing of the sPUCCH may be after $T_{sPUSCH}$ and $T_{sPUCCH}$, respectively.

$T_{sPUSCH}$=func($T_{sPDCCH}+d*TTI_{sDL}$, indeX($TTI_{sUL}$))+ $e*TTI_{sUL}$ $T_{sPUCCH}$=func($T_{sPDSCH}+d*TTI_{sDL}$, index($TTI_{sUL}$))+ $e*TTI_{sUL}$ Likewise, a transmission timing of the sPDCCH for the sPUSCH and a transmission timing of the sPDSCH for the sPUCCH may be determined as follows. An actual transmission timing of the sPDSCH and an actual transmission timing of the sPDCCH may be after $T_{sPDSCH}$ and $T_{sPDCCH}$, respectively.

$T_{sPDSCH}$=func($T_{sPUCCH}+d*TTI_{sUL}$, index($TTI_{sDL}$))+ $e*TTI_{sDL}$ $T_{sPDCCH}$=func($T_{sPUSCH}+d*TTI_{sUL}$, index($TTI_{sDL}$))+ $e*TTI_{sDL}$ func(a, index(b)) is a function for determining a timing at which the encoding time budget starts to be considered upon considering the decoding time budget and the encoding time budget starting from a signal reception timing as described above. In other words, func(a, index(b)) is a function for calculating a specific k-th index (typically, the last index) of b when a and b overlap.

For example, the transmission timing of the sPUSCH for the sPDCCH carrying a UL grant may be determined as a timing after an $e*TTI_{sUL}$-th UL TTI considering an encoding time from a specific k-th UL index (e.g., typically, the last UL index) among index(es) of TTIs overlapping with a $d*TTL_{sDL}$-th DL TTI starting from a timing $T_{sPDCCH}$ at which the sPDCCH is transmitted.

As another example, the sPUCCH may be transmitted in an e-th $TTI_{sUL}$ from an index of a specific k-th UL TTI (typically, the last UL TTI) among UL TTI(s) overlapping with DL TTI '$T_{sPDSCH}+d*TTI_{sDL}$'. The sPUCCH basically includes A/N information for the sPDSCH. In this case, each of the sPUSCH and the sPUCCH is transmitted during $TTI_{sUL}$.

Assuming that a PHICH or a UL grant carries A/N information for the sPUSCH, a timing at which A/N for the PHICH, the PHICH, or the UL grant is transmitted may be determined as follows in consideration of an sPUSCH decoding time and an sPDCCH encoding time based on the transmission timing of the sPUSCH.

$T_{sPHICH} = \text{func}(T_{sPUSCH} + d*TTI_{sUL}, \text{index}(TTI_{sDL})) + e*TTI_{sDL}$ When a timing at which A/N information for the sPUSCH is transmitted is $T_{sPHICH}$, the A/N information for the sPUSCH may be transmitted after $T_{sPHICH}$.

The meaning of "a UL TTI may differ from a DL TTI" contains the possibility that a TTI for each channel may be different. Physical channels may be divided into control channels and data channels. Specifically, the physical channels may be divided into a DL data channel, a DL control channel, a UL data channel, and a UL control channel. To avoid confusion with a legacy LTE/LTE-A channel, a DL data channel, a DL control channel, a UL data channel, and a UL control channel, transmitted in units of TTIs less than 1 ms, are referred to as an sPDSCH, an sPDCCH, an sPUSCH, and an sPUCCH. Hereinbelow, a scheme of varying a TTI length or a transmission time for each channel while varying a UL TTI length and a DL TTI length will be described in Section B. When a TTI for each channel is different, transmission/reception timings may be configured according to channels. A TTI size, i.e., TTI length, may be semi-statically configured by higher layers. TTI sizes for the sPDCCH, the sPDSCH, and the sPUSCH may be dynamically varied. When a TTI size of each channel is dynamically varied, the TTI length of the sPDCCH may be restricted by the TTI length of the sPDSCH. The TTI length of the sPDCCH is set to be equal to or less than the TTI length of the sPDSCH. Thus, an sPDCCH SS of the UE is set within a time length less than the TTI length of the sPDSCH. Alternatively, when the TTI size of each channel is different, the number of TTIs which are simultaneously scheduled may be different. For example, when the TTI length of the sPDCCH is one symbol, this means that the sPDCCH may be dynamically mapped over one TTI, two TTIs, or four TTIs. When the sPDCCH is dynamically mapped to one TTI, two TTIs, or four TTIs, the smallest sPDCCH TTI length may be signaled to the UE. Then, the UE may search for the sPDCCH in TTIs corresponding to a multiple of an integer of the smallest sPDCCH TTI length. The number of times of searching for the sPDCCH by the UE may be a value corresponding to the maximum number of sPDSCH TTI lengths. When the sPDCCH is mapped over multiple TTIs, the UE may assume that resource block(s) occupied by the sPDCCH are dynamically changed. For example, when the sPDCCH is transmitted over one TTI, one resource block may correspond to L PRBs. When the sPDCCH is transmitted over two TTIs, one resource block may correspond to 'L/2' PRBs. This may mean that, when the sPDCCH is transmitted over multiple TTIs, the number of PRBs that should be allocated to the sPDCCH in the frequency domain decreases in proportion to the increased number of TTIs. In addition, this means that the concept of a PRB or the bandwidth of the PRB may be dynamically changed according to the number of TTIs scheduled for the sPDCCH.

Particularly, when the sPDSCH or the sPUSCH is transmitted over multiple TTIs, it may be assumed that an additional TB is transmitted in one TTI. In other words, an additional complete TB may be transmitted in each TTI. This serves to perform decoding before a UE and a network receives all data transmitted over multiple TTIs and has an effect of performing scheduling for the sPDSCH or the sPUSCH over multiple TTIs. When the additional TB is transmitted in every TTI, this may mean that one large TB may be fragmented in a physical layer or a medium access control (MAC) layer in order to reduce higher layer overhead. A short cyclic redundancy check (CRC) length for each fragment which is present in each TTI may be used. In other words, a signal transmitted/received in one TTI may be a part of the entire TB. For example, the sPDSCH/sPUSCH carrying one entire TB may be transmitted over multiple TTIs and a part of the entire TB mapped to a corresponding TTI may be transmitted in each of the multiple TTIs. Since the additional TB which is a part of the entire TB is transmitted in each TTI, the UE/eNB may receive/decode even only a part of the entire TB. A CRC applied to the entire TB may be assumed. Only one A/N for all multiple TTIs may be transmitted or an A/N for each TTI or each fragment may be transmitted.

Even if a system is designed such that a TTI varies according to channels, a specific TTI length may be designated as a basic unit TTI length. For example, a transmission time length of each channel may a value of a multiple of an integer of the basic unit TTI and a transmission time length of each channel cannot be smaller than the basic unit TTI. Likewise, a basic unit resource may be defined for resources in the frequency domain. For example, a basic unit TTI in the time domain and the number of basic unit subcarriers may be defined as one reference resource unit. According to the number of reference resource units, resources in the time-frequency domain may be more conveniently scaled and used.

If a short TTI is introduced, channel multiplexing of various forms is possible. It is difficult to apply a legacy PDCCH transmitted over all bands and an EPDCCH spread in the time domain to an sTTI while only one to four OFDM symbol(s) are used. Accordingly, modifications should be made to the design of a control channel. The legacy PDCCH is transmitted on one, two, three, or four OFDM symbols and the PDSCH is transmitted on a symbol after symbol(s) on which the legacy PDCCH is transmitted. A time unit in which the PDCCH and the PDSCH are transmitted is 1 ms and the time unit of 1 ms constitutes one subframe. Accordingly, after decoding the PDCCH, the UE discerns whether a PDSCH thereof is scheduled and whether a UL grant is present and identifies information about a PHICH etc. When the UL grant is present, the UE transmits a PUSCH in subframe n+4 which is the fourth subframe after subframe n in which the PDCCH is received. That is, in a legacy system, UL/DL transmission is performed based on a subframe of a 1-ms unit. To secure a decoding time of a reception end, when the UE receives the UL grant in subframe n in the legacy LTE system, the UE may transmit the PUSCH in subframe n+4 (in the case of a TDD system, a subframe after subframe n+4) and receives the PHICH for the PUSCH in subframe n+8. Likewise, if the PDSCH is received in subframe n, A/N for the PDSCH is transmitted in subframe n+4 (in the case of the TDD system, a subframe after subframe n+4).

A time duration in which an sPDCCH is transmitted may be defined as one sPDCCH TTI and a time duration in which an sPDSCH is transmitted may be defined as one sPDSCH TTI. For example, it is assumed that, in the legacy system, the PDCCH is transmitted on two symbols and the PDSCH is transmitted on 12 symbols. In addition, assuming that four TTIs are defined or configured as each of a decoding budget and an encoding budget of the UE, the UE which has received a UL grant through the PDCCH considers a duration of two symbols in which the PDCCH is transmitted as a TTI in which the PDCCH is transmitted and transmits the PUSCH for the PDCCH after 4*2 symbols (=four $TTI_{PDCCH}$). For example, the PUSCH is transmitted in $TTI_{PDCCH}$ n+4 which is the fourth $TTI_{PDCCH}$ after $TTI_{PDCCH}$ n in which the PDCCH is received. Since a TTI length for the PDSCH is 12, A/N for the PDSCH is transmitted after 4*12 symbols (=4 $TTI_{PDSCH}$) starting from a TTI in which the PDSCH is received. For example, A/N is transmitted in $TTI_{PDSCH}$ n+4 which is the fourth $TTI_{PDSCH}$ after $TTI_{PDSCH}$ n in which the PDSCH is received.

As described above, d TTIs may be secured as the decoding time budget considering propagation delay, data decoding, etc. of the reception end and e TTIs may be secured as the encoding timing budget considering data generation, encoding time, etc. of the transmission end. If a UL TTI length differs from a DL TTI length, the decoding time budget and the encoding time budget need to be separately considered. In addition, UL/DL channel transmission timings corresponding to the decoding time budget and the encoding time budget should be determined in consideration of each of the decoding time budget and the encoding time budget.

$TTI_{sPDCCH}$, $TTI_{sPDSCH}$, $TTI_{sPUSCH}$, $TTI_{sPUCCH}$ indicate unit timing times, i.e., TTIs, of the sPDCCH, the sPDSCH, the sPUSCH, and the sPUCCH, respectively. $T_{sPDCCH}$ and $T_{sPDSCH}$ indicate timings (indexes) at which the UE transmits the sPDCCH and the sPDSCH, respectively. $TTI_{sPUSCH}$ and $TTI_{PUCCH}$ indicate timings (indexes) at which the eNB transmits the sPUSCH and the sPUCCH, respectively. In this case, a decoding time and an encoding time for each channel may be generalized as follows.

Decoding time for sPDCCH: $d*TTI_{sPDCCH}$
Decoding time for sPDSCH: $d*TTI_{sPDSCH}$
Decoding time for sPUSCH: $d*TTI_{sPUSCH}$
Decoding time for sPUCCH: $d*TTI_{sPUSCH}$
Encoding time for sPDCCH: $e*TTI_{sPDCCH}$
Encoding time for sPDSCH: $e*TTI_{sPDSCH}$
Encoding time for sPUSCH: $e*TTI_{sPUSCH}$
Encoding time for sPUCCH: $e*TTI_{sPUCCH}$ That is, a time consumed to decode each channel is proportional to a time length during which each channel is received and a time consumed to encode each channel is proportional to a time length during which each channel is transmitted. Generally, the decoding time budget and the encoding time budget may be equally set, i.e., d=e. Meanwhile, for flexibility of system operation, d and e may be differently set with respect to each UE or each channel. In this case, d and e for each UE or each channel may be semi-statically signaled to the UE through higher layer signaling. Alternatively, the UE may report, to the eNB, minimum values of d and e capable of being supported thereby by categories or capabilities of the UE and the eNB may inform the UE of d and e which will be used in an actual system.

An sPUSCH transmission timing and an sPUCCH transmission timing may be as follows.

$T_{sPUSCH}$=func($T_{sPDCCH}$+d*$TTI_{sPDCCH}$, index($TTI_{sPUSCH}$)+e*$TTI_{sPUSCH}$ $T_{sPUCCH}$=func($T_{sPDSCH}$+d*$TTI_{sPDSCH}$, index($TTI_{sPUCCH}$)+e*$TTI_{sPUCCH}$ Herein, func(a, b) is a function for determining a timing at which the encoding time budge starts to be considered upon considering the decoding time budget and the encoding time budget from the sPDCCH transmission timing as described above. In other words, func(a, index(b)) is a function for calculating a specific k-th index (typically, the last) of b when a and b overlap.

For example, the transmission timing of the sPUSCH for the sPDCCH carrying the UL grant is the e-th $TTI_{sPUSCH}$ stating from an index of the k-th (typically, last) UL TTI among UL TTI(s) overlapping '$T_{sPDCCH}$+d*$TTI_{sPDCCH}$', i.e., among $TTI_{sPUSCH}$(s). Likewise, the transmission timing of the sPUCCH for the sPDSCH is the e-th $TTI_{sPUCCH}$ starting from an index of a specific k-th (typically, last) $TTI_{sPUCCH}$ among UL TTI(s) overlapping '$T_{sPDSCH}$+d*$TTI_{sPDSCH}$', i.e., among $TTI_{sPUCCH}$(s). The sPUCCH basically includes A/N information for the sPDSCH. In this case, the sPUSCH and the sPUCCH are transmitted during $TTI_{sPUSCH}$ and $TTI_{sPUCCH}$, respectively.

When it is assumed that A/N for the sPUSCH, the PHICH or UL grant carries A/N information for an sPUSCH, a timing at which the A/N, the PHICH, or the UL grant is transmitted may be determined by the following equation in consideration of an sPUSCH decoding time and an sPDCCH decoding time based on a transmission timing for the sPUSCH.

$T_{sPHICH}$=func($T_{sPUSCH}$+d*$TTI_{sPUSCH}$, index($TTI_{sPDCCH}$))+e*$TTI_{sPDCCH}$ If a timing at which A/N for the sPUSCH is transmitted is $T_{sPHICH}$, A/N for the sPUSCH is transmitted in $T_{sPHICH}$ during a time of $TTI_{sPDCCH}$.

When a TTI length of the sPDSCH is different from a TTI length of the sPDCCH, the UE always performs first blind decoding for the sPDCCH in an sPDCCH SS thereof. However, if the sPDSCH of the UE is scheduled in a region defined as the sPDCCH SS for a specific UE, the UE does not perform blind decoding for the sPDCCH region because the sPDSCH thereof is transmitted in the sPDCCH SS which is present in the sPDSCH. As another scheme, since sPDCCH transmission for another TTI to the UE should be possible regardless of sPDSCH scheduling in a corresponding TTI, the UE may perform blind decoding for sPDCCH detection even in the sPDCCH SS in the sPDSCH scheduled thereby and the eNB may schedule the sPDSCH by rate-matching a resource in which the sPDCCH is present.

When the sPUSCH transmission timing and the sPUCCH transmission timing are determined as proposed above, a timing at which the UE transmits the sPUSCH and a timing at which the UE transmits the sPUCCH may overlap. In this case, the UE may simply transmit the sPUSCH and the sPUCCH. To maintain a single carrier property in UL, when the sPUCCH is configured to be transmitted by being piggybacked on the sPUSCH, the UE may transmit UCI which is to be transmitted through the sPUCCH by being carried on the sPUSCH and a TTI of the sPUSCH on which the sPUCCH is piggybacked conforms to a TTI of the sPUSCH.

<B. UL/DL Channel Configuration>

In Section A, the transmission/reception timing of the UL/DL channel according to the present invention has been described when the UL TTI length differs from the DL TTI length. As mentioned in Section A, if the UL TTI length differs from the DL TTI, this includes the possibility that a TTI length of each channel may be different. To avoid confusion with a legacy LTE/LTE-A channel, a DL data channel, a DL control channel, a UL data channel, and a UL control channel, transmitted in units of a TTI less than 1 ms, are referred to as an sPDSCH, an sPDCCH, an sPUSCH, and an sPUCCH, respectively. Hereinafter, a scheme of varying a TTI length or a transmission time for each channel according to each channel while varying the UL TTI length and the DL TTI length will be described.

Configuration of sPDCCH TTI Size

When a TTI length of each channel is set to be different, the most basic channel is an sPDCCH carrying control information that the eNB transmits to the UE. A TTI of the sPDCCH may also be changed according to one of the following schemes.

*Scheme 1. A Legacy PDCCH Indicates an sPDCCH TTI Size.

Figure 17:
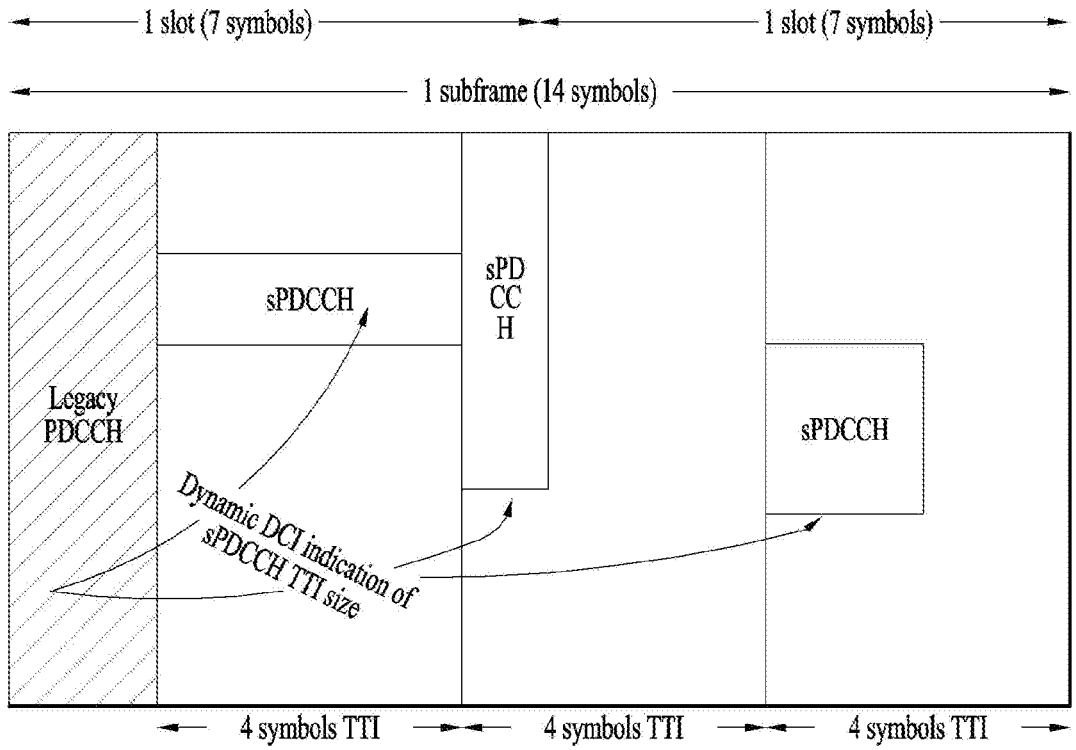
FIG. 17 illustrates a method of configuring a TTI size for a DL control channel according to the present invention.

FIG. 17 illustrates a method of configuring a TTI size for a DL control channel according to the present invention.

Basically, one channel transmitted at a specific location at a fixed time period is present. Thereafter, information about a transmission length of an sPDCCH may be transmitted through the corresponding channel A legacy PDCCH transmitted using a specific number of OFDM symbol(s) starting from a subframe start timing in every subframe of 1 ms may indicate the TTI size of the sPDCCH having the possibility of being transmitted within a corresponding subframe or during N subframes including the corresponding subframe. The length of the sPDCCH may vary in every subframe or at every sPDCCH transmission timing. Information about length(s) of the sPDCCH may be transmitted through DCI carried by the legacy PDCCH.

Scheme 1 may also be applied when a legacy system is not present. For example, a specific channel provides information about a control channel transmitted in every TTI. The specific channel is periodically transmitted at a predetermined time interval. The information about the control channel transmitted in every TTI may include information as to how long time duration the control channel is transmitted and which frequency resource the control channel uses. In other words, a specific control channel periodically transmitted at a predetermined time interval is present and the specific control channel which is periodically transmitted may provide information about control channel(s) which are transmitted at a shorter period.

*Scheme 2. A Common Signal Indicates an sPDCCH TTI Size

Figure 18:
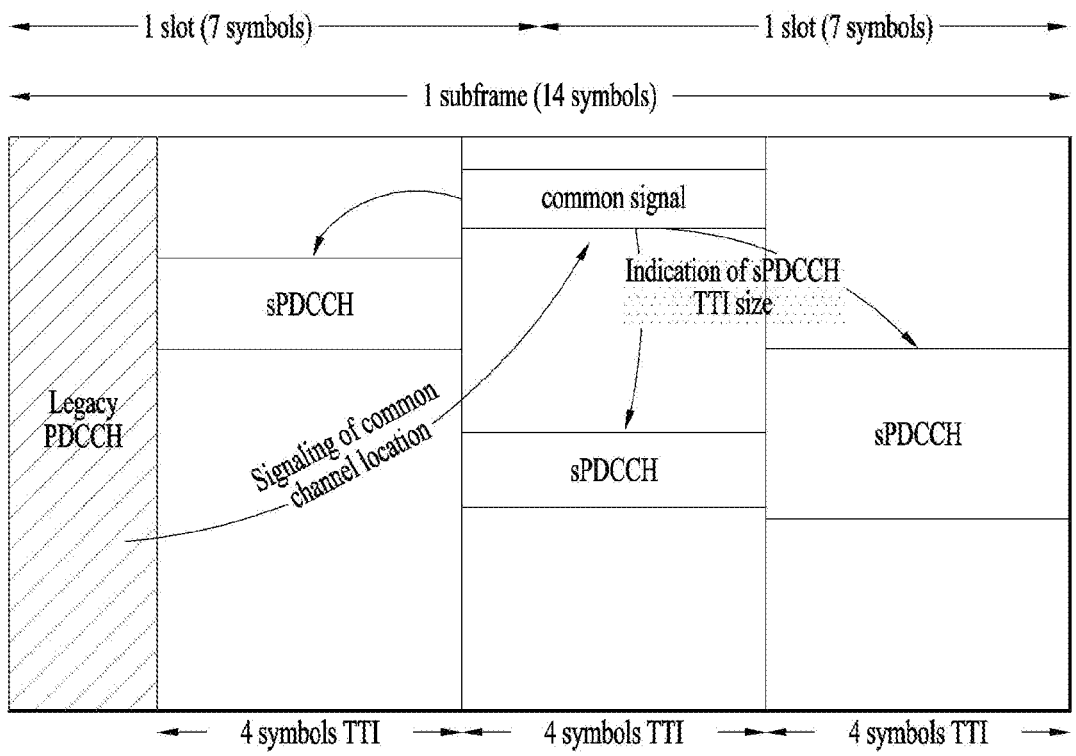
FIG. 18 illustrates another method of configuring a TTI size for a DL control channel according to the present invention.

FIG. 18 illustrates another method of configuring a TTI size for a DL control channel according to the present invention. Particularly, FIG. 18 illustrates a scheme of providing control information about a common signal/channel through a legacy PDCCH in a legacy LTE system and informing the UE of TTI length and time/frequency information about an sPDCCH through the common signal/channel Scheme 2 provides information about the sPDCCH to the UE through the common signal or the common channel. The common signal carries information about sPDCCH(s) in a legacy TTI, i.e., in a subframe or N subframes. For example, when N=1, information about the common signal/channel may be included in the legacy PDCCH in every subframe. In this case, when the information about the common signal/channel is not present in the legacy PDCCH, the UE may assume that an sTTI based DL signal such as an sPDCCH/sPDSCH is not present in a corresponding subframe. Alternatively, when the information about the common signal/channel is not present in the legacy PDCCH, the UE may regard information received in a previous subframe as valid information with respect to a short TTI channel in the corresponding subframe.

To transmit/receive a signal transmitted in an sTTI, the UE needs to first decode a corresponding common signal. To decode the common signal/channel, information such as a location of a time-frequency resource and a modulation and coding scheme (MCS), used to transmit the common signal/channel, is transmitted through the legacy PDCCH. A modulation order or a coding rate may be fixed to a specific modulation order and a specific coding rate or may be semi-statically varied through higher layer signaling. When Scheme 2 is used, not only a TTI length of the sPDCCH but also common information about the other channel(s) transmitted in the sTTI may be transmitted. For example, the common information may include an sPDSCH TTI length, information about a frequency resource in which the sPDSCH is transmitted, and TTI length information for sPUSCH/sPUCCH transmission/reception.

In other words, the eNB may transmit common information about the sTTI through the common signal/channel at a specific time/frequency location. The control information about the common signal/channel may be provided through other control channels which are periodically transmitted at a longer time interval than the sTTI. If the other control channels are transmitted at a relatively short period, the information about the sTTI may be dynamically updated. However, if the other control channels are transmitted at a relatively long period, the information about the sTTI is semi-statically updated. Alternatively, a time/frequency location at which the common information about the sTTI is transmitted may be preconfigured through higher layer signaling. If a transmission period and a frequency location of the common signal/channel are fixed in a system, Scheme 2 may be similar to Scheme 1. That is, if the information about the short TTI is indicated through the legacy PDCCH and the common signal/channel for the sTTI is regarded as the legacy PDCCH, Scheme 2 may be identical to Scheme 1.

The common signal/channel providing the common information about the sTTI may be transmitted at a specific period. A transmission period of the common signal/channel may be preconfigured. TTI length(s) and other configuration(s) of channel(s) transmitted in the sTTI at a corresponding transmission period may be changed. Information provided by the common signal/channel is valid from the common signal/channel transmission until the next transmission period. Alternatively, the common signal/channel may not be periodically transmitted. In this case, information carried by the common signal/channel may designate a valid time duration. Regardless of a transmission period or a valid time of the common signal/channel, the information about the common signal/channel may be dynamically transmitted by a dynamic DL control indicator at every time needed by the eNB. In this case. information transmitted through dynamic DCI takes priority over periodically transmitted common information. The UE preferentially trusts the latest received common signal/channel. That is, the most recently received information overrides the previously received information.

If a corresponding channel is not transmitted although a specific control signal/channel for providing information about the short TTI channel is configured to be periodically transmitted, the UE may trust previously transmitted information. Alternatively, since the corresponding channel has not been transmitted at a corresponding period, the UE may recognize that there is no channel transmitted in the sTTI during the corresponding period. Similarly, if a corresponding channel for providing the information about the sTTI is not transmitted even after a valid time of the information elapses in a situation in which the specific common signal/channel for providing the information about the short TTI channel is configured to be aperiodically transmitted, the UE may trust the previously transmitted information. Alternatively, the UE may recognize that there is no channel transmitted in the sTTI during a corresponding time until other information is provided after the valid time elapses.

*Scheme 3. UE Blind-Detects other TTI Sizes

According to Scheme 3, the UE blind-detects a channel transmitted with a different TTI size at every time. Basically, since the UE can decode a data channel after decoding an sPDCCH, the UE first performs an operation of decoding the sPDCCH by performing blind detection with respect to information about a TTI size and frequency with which the sPDCCH is transmitted. However, when the TTI size is capable of being dynamically changed, the UE is significantly burdened with blind detection because no initial information is given and the UE may not actually detect blind detection. Therefore, the UE may be preinformed of a set for blind detection so as to cause the UE to perform blind detection within the set.

The UE is informed of a TTI size that can be used by a specific UE or system during a specific time or period through higher layer signaling. For example, if values of the TTI size are {2, 4, 7} OFDM symbols, the UE is informed of these values through higher layer signaling. These values may be semi-statically updated. After receiving candidate information about the TTI size, the UE blind-detects an sPDCCH of a 2-symbol length, a 4-symbol length, or a 7-symbol lengths under the assumption that the sPDCCH configured as a variable TTI can be transmitted. The UE performs blind detection and decoding under the assumption that sPDCCHs having corresponding size(s) can be dynamically combined in various manners within a time duration in which a set of TTI sizes is valid.

Figure 19:
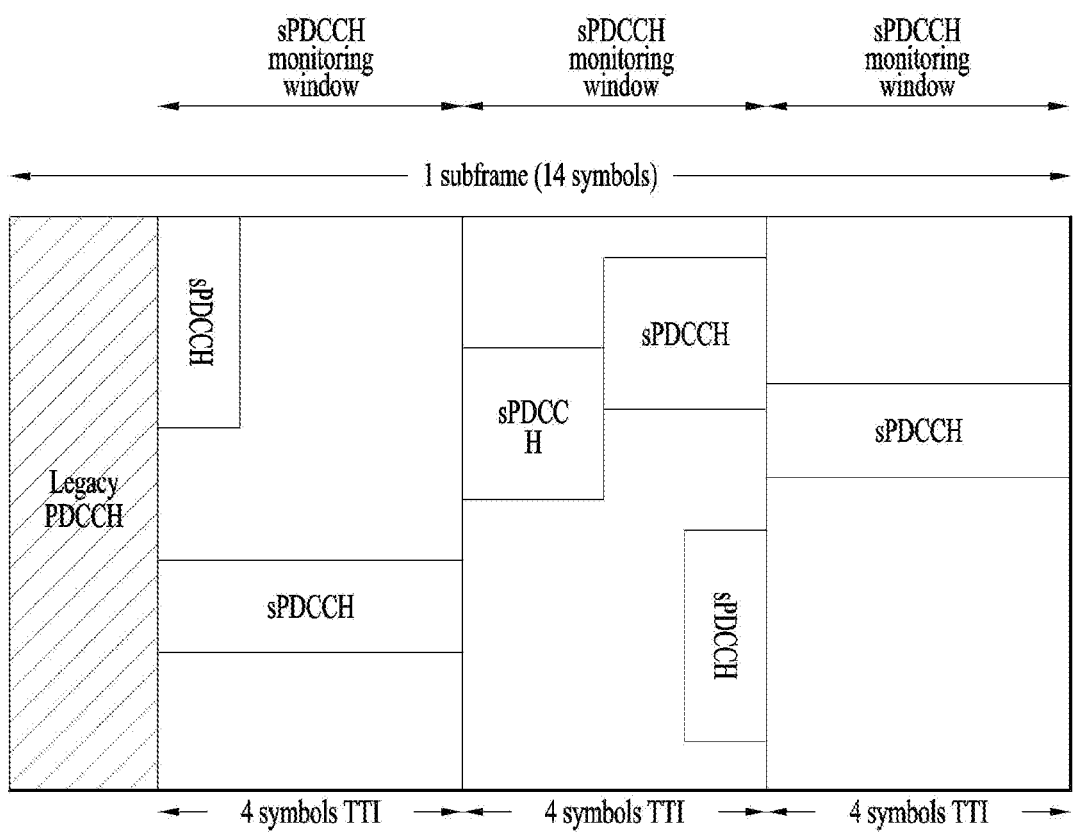
FIG. 19 is still another method of configuring a TTI size for a DL control channel according to the present invention.

FIG. 19 is still another method of configuring a TTI size for a DL control channel according to the present invention. Particularly, FIG. 19 is illustrated to explain an sPDCCH blind detection scheme using an sPDCCH monitoring window.

To raise blind detection performance for an sPDCCH by the UE, the sPDCCH monitoring window in which the UE needs to monitor the sPDCCH may be additionally designated. That is, the eNB may configure the sPDCCH monitoring window for the UE. The eNB may also designate a TTI size value of the sPDCCH in the sPDCCH monitoring window. The number of TTI sizes may be one or more. The UE may be informed of a set of values of the TTI sizes as described previously.

Referring to FIG. 19, the sPDCCH monitoring window used within a predetermined time duration is indicated to the UE through higher layer signaling and the UE may detect the sPDCCH according to information about the set of TTI sizes indicated to the UE within the sPDCCH monitoring window. FIG. 19 illustrates the case in which the set of the TTI sizes is a {1, 2, 4}-symbol length.

—Configuration of sPDSCH TTI Size

If the UE recognizes a TTI length in which an sPDCCH is transmitted and decodes the sPDCCH, the UE receives a data channel, i.e., an sPDSCH, that the eNB desires to actually transmit. In a system varying a TTI length, a TTI length of the sPDSCH as well as a TTI length of the sPDCCH may be varied. Accordingly, the UE needs to be aware of a transmission length of the sPDSCH. In a system according to the present invention, the length of the sPDSCH may be configured by the following scheme.

The TTI length of the sPDSCH may simply conform to the TTI length of the sPDCCH. The meaning of "the TTI length of the sPDSCH conforms to the TTI length of the sPDCCH" may represent that the sPDSCH is transmitted during a time duration in which the sPDCCH is transmitted. That is, the sPDCCH and the sPDSCH may be frequency division multiplexed in the frequency domain while occupying the same time region. Alternatively, the TTI length of the sPDSCH may be implicitly or explicitly determined by the length of the sPDCCH. If the length of the sPDSCH is implicitly determined when the length of the sPDCCH is one symbol for example, the length of the sPDSCH is two OFDM symbols after the sPDCCH. If the length of the sPDCCH is two symbols, the length of the sPDSCH is four OFDM symbols after the sPDCCH. In this way, the relationship between the length of the sPDCCH and the length of the sPDSCH may be fixed. In contrast, if the length of the sPDCCH is explicitly determined, this may represent that the length of the sPDSCH is explicitly indicated through the sPDCCH. The UE recognizing the TTI length of the sPDCCH using the schemes described in "Configuration of sPDCCH TTI size" may be aware of the TTI length of the sPDSCH corresponding to the sPDCCH through information carried by the sPDCCH. In other words, the UE may be informed of the TTI length of the sPDSCH corresponding to the sPDCCH through the sPDCCH as if the UE is informed of OFDM symbols on which the PDCCH is transmitted through the PCFICH in a legacy LTE system.

Figure 20:
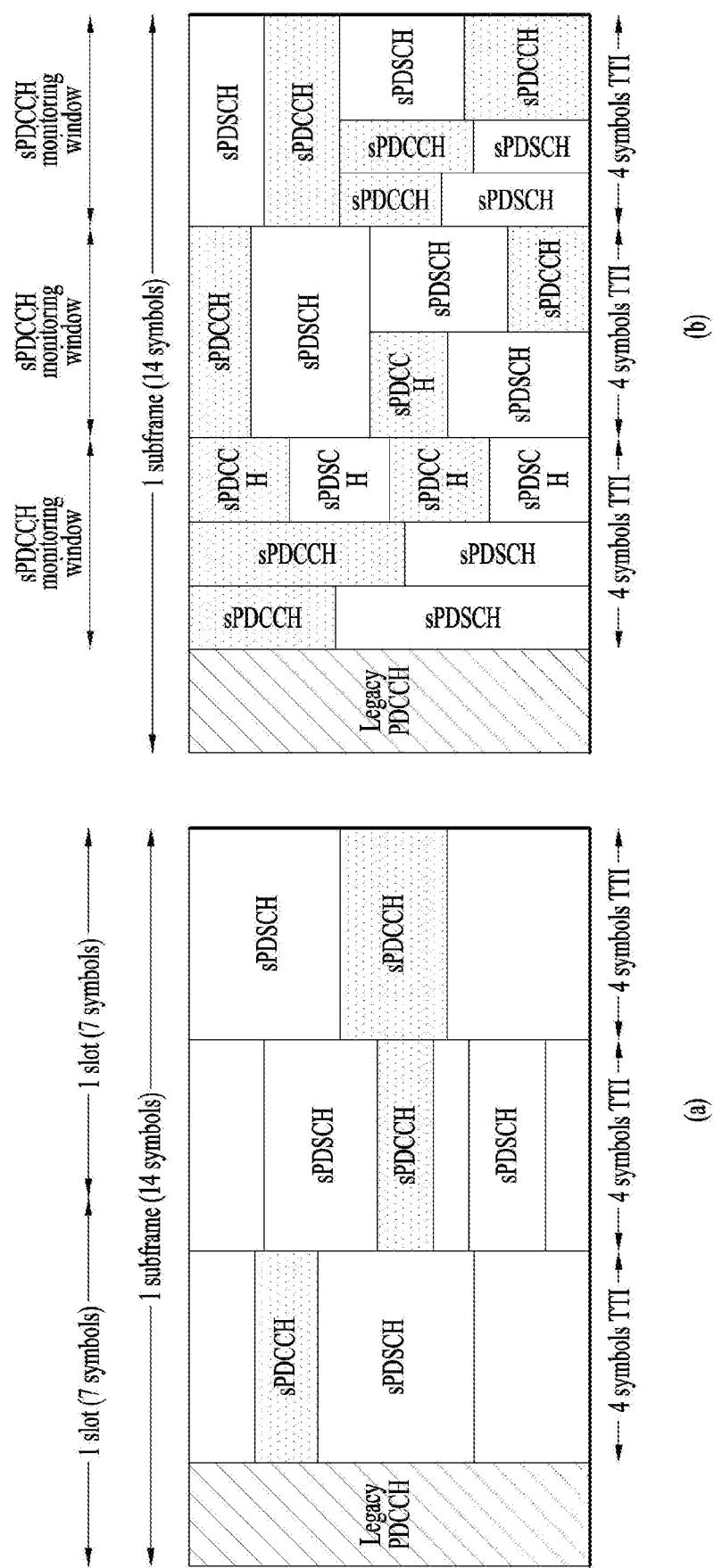
FIG. 20 illustrates a method of configuring a TTI size of a DL data channel according to the present invention.

FIG. 20 illustrates a method of configuring a TTI size of a DL data channel according to the present invention. Particularly, FIG. 20 illustrates a method of determining a TTI length of an sPDSCH according to a TTI length of an sPDCCH.

Referring to FIG. 20(a), the relationship of sPDCCH TTI size=sPDSCH TTI size may be satisfied.

Referring to FIG. 20(b), an sPDCCH monitoring window is defined and the UE performs decoding by detecting the sPDCCH within the sPDCCH monitoring window. Then, the UE may demodulate/decode the sPDSCH under the assumption that the TTI length of the sPDSCH corresponding to the sPDCCH is equal to the TTI length of the sPDCCH.

Figure 21:
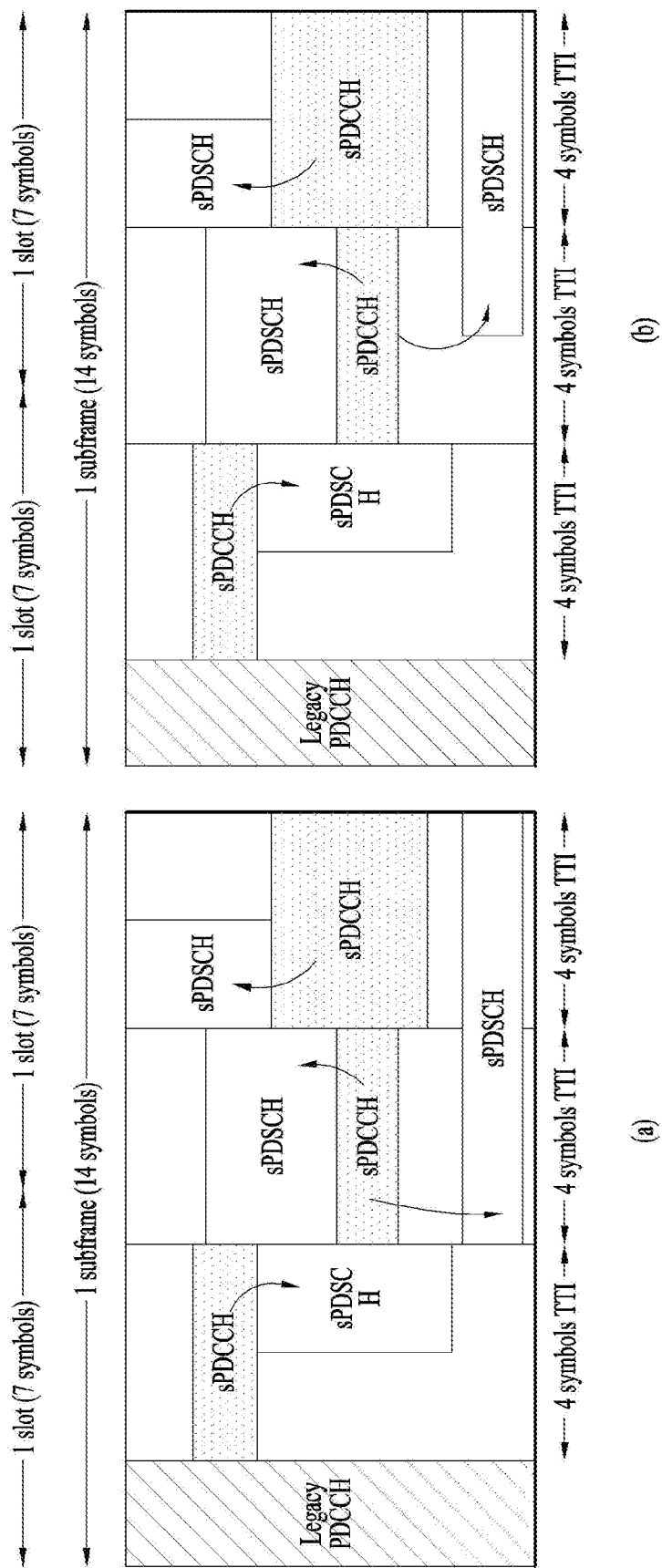
FIG. 21 illustrates another method of configuring a TTI size of a DL data channel according to the present invention.

FIG. 21 illustrates another method of configuring a TTI size of a DL data channel according to the present invention.

Unlike the method illustrated in FIG. 20, the TTI length of the sPDSCH may be dynamically indicated to the UE according to the method illustrated in FIG. 21. When prioritizing flexibility of system design, the TTI length of the sPDSCH may be configured regardless of the TTI length of the sPDCCH and information about the TTI length of the sPDCCH may be signaled to the UE. In this case, the UE may be informed of information about timings at which sPDSCH transmission is started and ended or information about the TTI length of the sPDSCH through the sPDCCH. Alternatively, the TTI length of the sPDSCH may be indicated through the sPDCCH under the assumption that the sPDSCH is always started at a timing at which transmission of the sPDCCH corresponding to the sPDSCH is started or ended.

Figure 22:
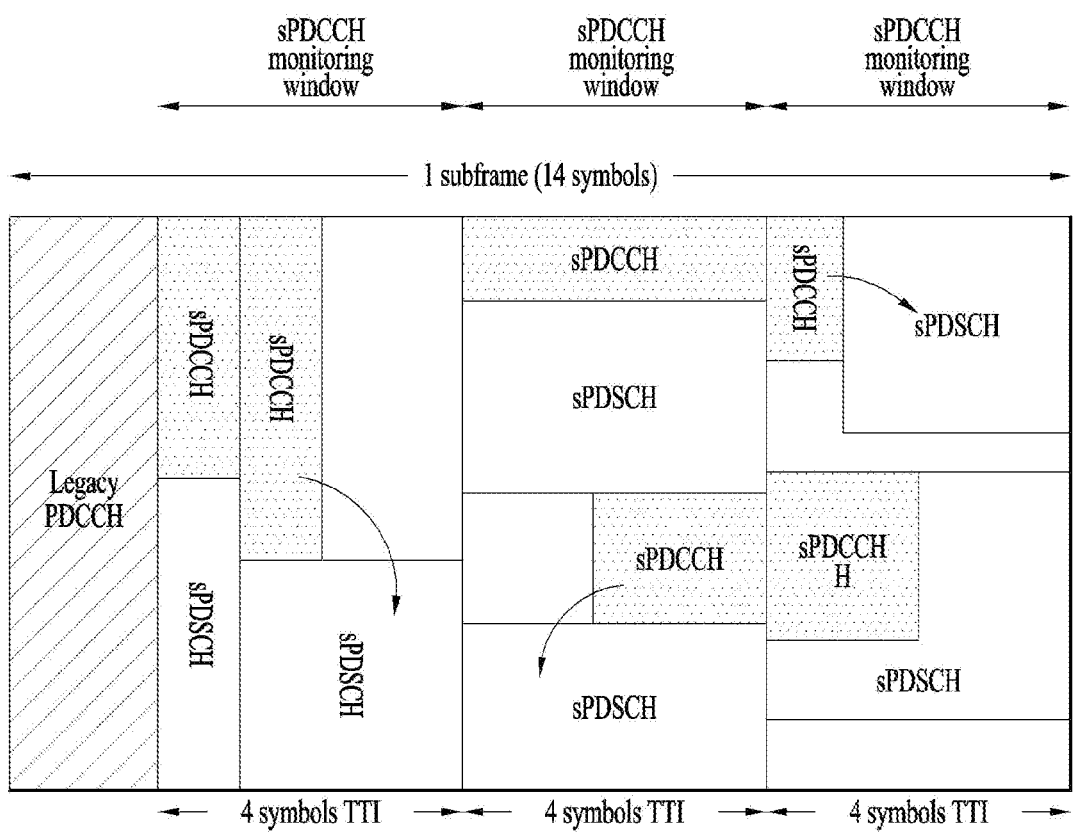
FIG. 22 illustrates still another method of configuring a TTI size of a DL data channel according to the present invention.

FIG. 22 illustrates still another method of configuring a TTI size of a DL data channel according to the present invention.

Referring to FIG. 22, the TTI length of the sPDSCH may be dynamically varied within a predetermined range. The TTI length of the sPDSCH may be restricted by the TTI length of the sPDCCH. For example, if the eNB configures an sPDCCH monitoring window for the UE, a time corresponding to the sPDCCH monitoring window may be defined as an S-TTI. The TTI length of the sPDSCH may have a plurality of values within the S-TTI. A symbol length of the TTI of the sPDSCH or the TTI length of the sPDSCH may be indicated to the UE through the sPDCCH. In this case, information about a timing at which the sPDSCH is started may be separately indicated to the UE through the sPDCCH. Alternatively, the timing at which the sPDSCH is started may be implicitly scheduled between the eNB and the UE without additional signaling. That is, it may be assumed that the sPDSCH is started from a timing at which the sPDCCH corresponding to the sPDSCH is started or ended. Alternatively, it may be assumed that the sPDSCH is started at a timing at which the S-TTI is started.

Configuration of sPUSCH TTI Size

Figure 23:
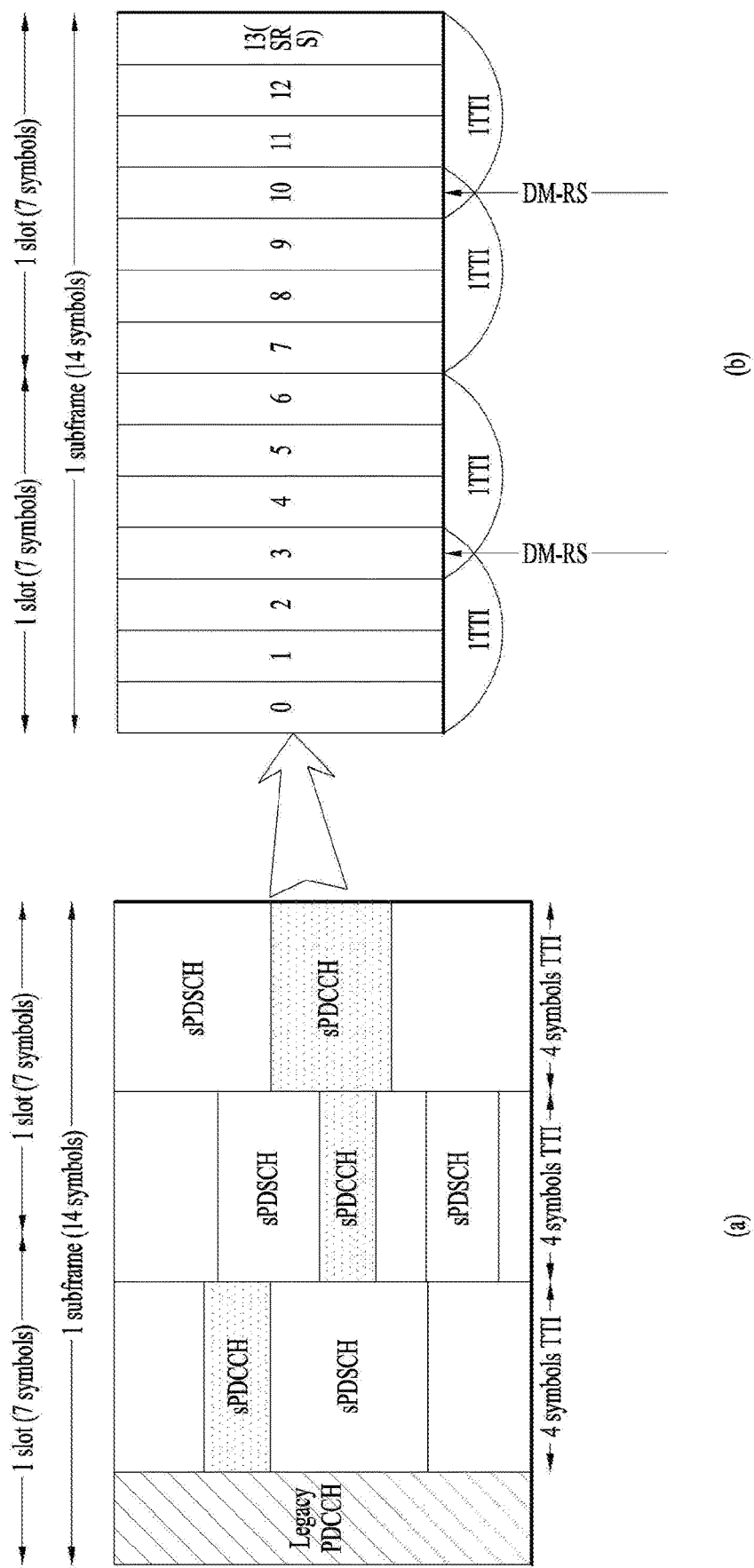
FIG. 23 illustrates a method of configuring a TTI size of a UL data channel according to the present invention.

FIG. 23 illustrates a method of configuring a TTI size for a UL data channel according to the present invention.

A TTI length of an sPUSCH may be semi-statically or implicitly indicated together with a TTI length of an sPDCCH. For example, referring to FIG. 23(a), the TTI length of the sPUSCH may conform to the TTI length of the sPDCCH.

The TTI length of the sPUSCH may be dynamically changed. The TTI length of the sPUSCH may be changed using a scheme similar to the scheme of changing the TTI length of the sPDSCH and informing the UE of the TTI length of the sPDSCH, described in the subsection "Configuration of sPUSCH TTI size". The TTI length of the sPUSCH may be determined by the TTI length of the sPDCCH.

If the TTI length of the sPDCCH is dynamically changed, the TTI length of the sPUSCH may also be dynamically changed.

As another scheme, the TTI length of the sPUSCH may be dynamically indicated to the UE irrespective of the TTI length of the sPDCCH. When the eNB informs the UE of the TTI length of the sPUSCH, the eNB may inform the UE of a start/end timing at which the sPUSCH is transmitted or the TTI length of the sPUSCH. In the latter, it may be assumed that the sPUSCH is started at a specific timing, for example, at a timing at which transmission of the sPDCCH is started or ended.

As illustrated in FIG. 15, an SC-FDM/OFDM symbol used for transmission of a UL-RS may be shared by two sTTIs. For example, referring to FIG. 23(b), sPUSCH (hereinafter, sPUSCH1) may be transmitted in an sTTI (hereinafter, sTTI1) including symbols 0 to 3 and an sPUSCH (hereinafter, sPUSCH2) may be transmitted in an sTTI (hereinafter, sTTI2) including symbols 3 to 6. The sPUSCH1 is mapped and transmitted over symbols 0 to 2 which are front symbols of the sTTI1 and a UL DM-RS for demodulating the sPUSCH1 is transmitted on symbol 3 which is the last symbol of the sTTI1. The sPUSCH2 is mapped and transmitted over symbols 4 to 6 which are the rear symbols of the sTTI1 and a UL DM-RS for demodulating the sPUSCH2 is transmitted on symbol 3 which is the first symbol of the sTTI2.

Configuration of sPUCCH TTI Size

A TTI length of the sPUCCH may be configured. Simply, since the sPUCCH carries information corresponding to a response of the UE to the sPDSCH in many cases, the TTI length of the sPUCCH may be implicitly indicated by the TTI length of the sPDSCH. For example, the relationship of TTI size of sPUCCH=TTI size of sPDSCH may be satisfied. However, when there is a large amount of information transmitted through the sPDSCH and the TTI of the sPDSCH is long, if the TTI length of the sPUCCH increases together with the TTI length of the sPDSCH, there is the danger of transmitting information such as A/N in UL too late. Therefore, the TTI length of the sPUCCH of the UE may always be fixed to a minimum or maximum value of the TTI length of the sPDCCH configured for the UE. Alternatively, the TTI length of the sPUCCH may always be fixed to a minimum or maximum value of a TTI length capable of being supported by a corresponding wireless communication system or network.

If the TTI length of the sPUCCH is varied, the TTI length of the sPUCCH may also be indicated by a DL grant of the sPDCCH in the same manner as the TTI length of another channel That is, the eNB may inform the UE of information about the TTI length of the sPUCCH carrying information such as A/N for DL scheduling information upon providing the DL scheduling information to the UE.

Figure 24:
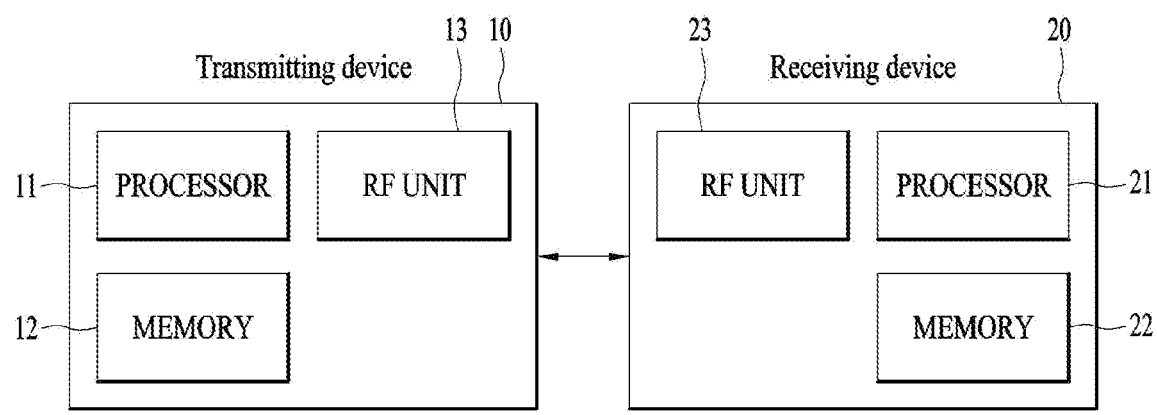
FIG. 24 is a block diagram illustrating elements of a transmitting device 10 and a receiving device 20 for implementing the present invention.

FIG. 24 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor according to the present invention may configure sTTIs in a basic TTI according to any one of the proposals of the present invention. The eNB processor may control the eNB RF unit to transmit sTTI configuration information to the UE. The UE processor according to the present invention may control the UE RF unit to receive the sTTI configuration information. The UE processor may configure the sTTIs within the basic TTI based on the sTTI configuration information.

The eNB processor according to the present invention may configure a TTI length of an sPDCCH, a TTI length of an sPDSCH, a TTI length of an sPUSCH, and/or a TTI length of an sPUCCH according to any one of the proposals of the present invention. The eNB processor may control the eNB RF unit to transmit information about the TTI length of the sPDCCH, the TTI length of the sPDSCH, the TTI length of the sPUSCH, and/or the TTI length of the sPUCCH to the UE. The eNB processor may control the eNB RF unit to transmit or receive a corresponding channel based on a corresponding TTI length of each channel. The UE according to the present invention may control the UE RF unit to receive the information about the TTI length of the sPDCCH, the TTI length of the sPDSCH, the TTI length of the sPUSCH, and/or the TTI length of the sPUCCH according to any one of the proposals of the present invention. The UE processor may control the UE RF unit to transmit or receive a corresponding channel based on a corresponding TTI length according to a TTI length of each channel.

The eNB processor according to the present invention may set a UL TTI length and a DL TTI length to be different. The eNB processor may control the eNB RF unit to transmit a DL channel based on a DL TTI length. The eNB processor may control the eNB RF unit to receive a UL channel based on a UL TTI length different from the DL TTI length. The UE processor according to the present invention may set the UL TTI length and the DL TTI length to be different. The UE processor may control the UE RF unit to receive the DL channel based on the DL TTI length. The UE processor may control the UE RF unit to transmit the UL channel based on a UL TTI length different from the DL TTI length.

The eNB processor according to the present invention may set a TTI length of each channel to be different according to channel type. The eNB processor may control the eNB RF unit to transmit/receive a corresponding channel according to a TTI length of a channel per channel type. The UE processor may assume that a TTI length of each channel is different according to channel type. The UE processor may control the UE RF unit to receive/transmit a corresponding channel according to a TTI length of a channel per channel type.

The eNB processor according to the present invention may control the eNB RF unit to transmit the sPDCCH, the sPDSCH, and/or a PHICH according to any one of the proposals of the present invention. The eNB processor may control the eNB RF unit to transmit the PHICH at a PHICH transmission timing determined according to the present invention. The eNB processor may control the eNB RF unit to receive the sPUSCH at an sPUSCH reception timing determined according to the present invention. The eNB processor may control the eNB RF unit to receive the sPUCCH at an sPUCCH reception timing determined according to the present invention. The UE processor according to the present invention may control the UE RF unit to receive the sPDCCH, the sPDSCH, and/or the PHICH according to any one of the proposals of the present invention. The UE processor may control the UE RF unit to receive the PHICH at a PHICH reception timing determined according to the present invention. The UE processor may control the UE RF unit to transmit the sPUSCH at an sPUSCH transmission timing determined according to the present invention. The UE processor may control the UE RF unit to transmit the sPUCCH at an sPUCCH transmission timing determined according to the present invention.

The UE processor may control the UE RF unit to transmit two sPUSCHs or two sPUCCHs in two sTTIs, respectively. The two adjacent sTTIs may be sTTIs configured to share one SC-FDM symbol or one OFDM symbol. The UE processor may control the UE RF unit to transmit the sPUSCH or sPUCCH (hereinafter, sPUSCH1/sPUCCH1) on front symbol(s) of an sTTI (hereinafter, sTTI1) which is located at the front part in the time domain among the two sTTIs and transmit a DM-RS for demodulating the sPUSCH1/sPUCCH1 on the last symbol of the sTTI1. The UE processor may control the UE RF unit to transmit the DM-RS for demodulating the sPUSCH or sPUCCH (hereinafter, sPUSCH2/sPUCCH2) on the first symbol of an sTTI (hereinafter, sTTI2) which is located at a rear part in the time domain among the two sTTIs and transmit the sPUSCH2/sPUCCH2 on the other symbol(s) of the sTTI2. The last symbol of the sTTI1 may be the first symbol of the sTTI2. The eNB processor may control the eNB RF unit to receive two sPUSCHs or two sPUCCHs in the two adjacent sTTIs, respectively. The eNB processor may control the eNB RF unit to receive the sPUSCH/sPUCCH1 on front symbol(s) of the sTTI1 in the sTTI which is located at the front part in the time domain among the two sTTIs and receive the DM-RS for demodulating the sPUSCH1/sPUCCH1 on the last symbol of the sTTI1. The eNB processor may control the eNB RF unit to receive the DM-RS for demodulating an sPUSCH2/sPUCCH2 on the first symbol of the sTTI2 in the sTTI2 which is located at a rear part in the time domain among the two sTTIs and receive the sPUSCH2/sPUCCH2 on the other symbol(s) of the sTTI2.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method of transmitting an uplink (UL) channel by a user equipment in a wireless communication system, the method comprising:
   receiving, in a time unit of a first length (first length time unit) # n, a physical downlink control channel (PDCCH) carrying an uplink grant for a physical uplink shared channel (PUSCH);
   transmitting, in a time unit of a second length (second length time unit) # m+k, the PUSCH based on the uplink grant;
   receiving, in a time unit of a third length (third length time unit) # x, a physical downlink shared channel (PDSCH); and
   transmitting, in a time unit of a fourth length (fourth length time unit) # y+j, a physical uplink control channel (PUCCH) carrying acknowledgement/negative acknowledgement (ACK/NACK) information for the PDSCH,
   wherein the first length and the second length are different,
   wherein the second length time unit # m+k where the PUSCH is transmitted is a k-th second length time unit after a second length time unit # m associated with the first length time unit # n having the PDCCH, where k is a non-negative integer,
   wherein the third length is greater than the fourth length,
   wherein the fourth length time unit # y+j where the PUCCH is transmitted is a j-th fourth length time unit after a fourth length time unit # y associated with the third length time unit # x having the PDSCH, where j is a non-negative integer, and
   wherein the fourth length time unit # y is a last fourth length time unit among a plurality of fourth length time units associated with the third length time unit # x.

2. The method according to claim 1, further comprising: receiving information regarding a value of k.

3. The method according to claim 1, further comprising: transmitting capability information of the user equipment, wherein the capability information includes information on a downlink channel decoding time at the user equipment and information on a uplink channel preparation time at the user equipment.

4. The method according to claim 1,
   wherein one of the first length and the second length is a normal transmission time interval (TTI) duration equal to 1 ms, and the other one is a short TTI duration equal to or shorter than 0.5 ms.

5. The method according to claim 4, further comprising: receiving configuration information regarding TTIs with the short TTI duration.

6. A method of receiving an uplink (UL) channel by a base station in a wireless communication system, the method comprising:
   transmitting, in a time unit of a first length (first length time unit) # n, a physical downlink control channel (PDCCH) carrying an uplink grant for a physical uplink shared channel (PUSCH) to a user equipment;
   receiving, in a time unit of a second length (second length time unit) # m+k, the PUSCH based on the uplink grant from the user equipment;
   transmitting, in a time unit of a third length (third length time unit) # x, a physical downlink shared channel (PDSCH); and
   receiving, in a time unit of a fourth length (fourth length time unit) # y+j, a physical uplink control channel (PUCCH) carrying acknowledgement/negative acknowledgement (ACK/NACK) information for the PDSCH,
   wherein the first length and the second length are different,
   wherein the second length time unit # m+k where the PUSCH is received is a k-th second length time unit after a second length time unit # m associated with the first length time unit # n having the PDCCH, where k is a non-negative integer, and
   wherein the third length is greater than the fourth length,
   wherein the fourth length time unit # y+j where the PUCCH is received is a j-th fourth length time unit after a fourth length time unit # y associated with the third length time unit # x having the PDSCH, where j is a non-negative integer, and
   wherein the fourth length time unit # y is a last fourth length time unit among a plurality of fourth length time units associated with the third length time unit # x.

7. The method according to claim 6, further comprising: transmitting information regarding a value of k to the user equipment.

8. The method according to claim 6, further comprising: receiving capability information of the user equipment, wherein the capability information includes information on a downlink channel decoding time at the user equipment and information on a uplink channel preparation time at the user equipment.

9. The method according to claim 6,
   wherein one of the first length and the second length is a normal transmission time interval (TTI) duration equal to 1 ms, and the other one is a short TTI duration equal to or shorter than 0.5 ms.

10. The method according to claim 9, further comprising: transmitting configuration information of TTIs with the short TTI duration.

11. A user equipment for transmitting an uplink (UL) channel in a wireless communication system, the user equipment comprising:
   a transceiver,
   a processor; and
   a computer memory operably connectable to the processor and storing instructions that, when executed, cause the processor to perform operations comprising:

receiving, via the transceiver in a time unit of a first length (first length time unit) # n, a physical downlink control channel (PDCCH) carrying an uplink grant for a physical uplink shared channel (PUSCH);

transmitting, via the transceiver, in a time unit of a second length (second length time unit) # m+k, the PUSCH based on the uplink grant;

receiving, via the transceiver in a time unit of a third length (third length time unit) # x, a physical downlink shared channel (PDSCH); and transmitting, via the transceiver in a time unit of a fourth length (fourth length time unit) # y+j, a physical uplink control channel (PUCCH) carrying acknowledgement/negative acknowledgement (ACK/NACK) information for the PDSCH, wherein the first length and the second length are different, wherein the second length time unit # m+k where the PUSCH is transmitted is a k-th second length time unit after a second length time unit # m associated with the first length time unit # n having the PDCCH, where k is a non-negative integer, wherein the third length is greater than the fourth length, wherein the fourth length time unit # y+j where the PUCCH is transmitted is a j-th fourth length time unit after a fourth length time unit # y associated with the third length time unit # x having the PDSCH, where j is a non-negative integer, and wherein the fourth length time unit # y is a last fourth length time unit among a plurality of fourth length time units associated with the third length time unit # x.

12. The user equipment according to claim 11, wherein the operations further comprise:
receiving, via the transceiver, information regarding a value of k.

13. The user equipment according to claim 11, wherein the operations further comprise:
transmitting, via the transceiver, capability information of the user equipment,
wherein the capability information includes information on a downlink channel decoding time at the user equipment and information on a uplink channel preparation time at the user equipment.

14. The user equipment according to claim 11,
wherein one of the first length and the second length is a normal transmission time interval (TTI) duration equal to 1 ms, and the other one is a short TTI duration equal to or shorter than 0.5 ms.

15. The user equipment according to claim 14, wherein the operations further comprise:
receiving, via the transceiver, configuration information of TTIs with the short TTI duration.

16. A base station for receiving an uplink (UL) channel in a wireless communication system, the base station comprising:
a transceiver,
a processor; and
a computer memory operably connectable to the processor and storing instructions that, when executed, cause the processor to perform operations comprising:
transmitting, via the transceiver in a time unit of a first length (first length time unit) # n, a physical downlink control channel (PDCCH) carrying an uplink grant for a physical uplink shared channel (PUSCH) to a user equipment;

receiving, via the transceiver in a time unit of a second length (second length time unit) # m+k, the PUSCH based on the uplink grant from the user equipment, transmitting, via the transceiver in a time unit of a third length (third length time unit) # x, a physical downlink shared channel (PDSCH); and receiving, via the transceiver in a time unit of a fourth length (fourth length time unit) # y+j, a physical uplink control channel (PUCCH) carrying acknowledgement/negative acknowledgement (ACK/NACK) information for the PDSCH, wherein the first length and the second length are different, wherein the second length time unit # m+k where the PUSCH is received is a k-th second length time unit after a second length time unit # m associated with the first length time unit # n having the PDCCH, where k is a non-negative integer, wherein the third length is greater than the fourth length, wherein the fourth length time unit # y+j where the PUCCH is received is a j-th fourth length time unit after a fourth length time unit # y associated with the third length time unit # x having the PDSCH, where j is a non-negative integer, and wherein the fourth length time unit # y is a last fourth length time unit among a plurality of fourth length time units associated with the third length time unit # x.

17. The base station according to claim 16, wherein the operations further comprise:
transmitting, via the transceiver, information regarding a value of k to the user equipment.

18. The base station according to claim 16, wherein the operations further comprise:
receiving, via the transceiver, capability information of the user equipment,
wherein the capability information includes information on a downlink channel decoding time at the user equipment and information on a uplink channel preparation time at the user equipment.

19. The base station according to claim 16,
wherein one of the first length and the second length is a normal transmission time interval (TTI) duration equal to 1 ms, and the other one is a short TTI duration equal to or shorter than 0.5 ms.

20. The base station according to claim 19, wherein the operations further comprise:
transmitting, via the transceiver, configuration information of TTIs with the short TTI duration.

* * * * *